INVENTORS
CHARLES M. MERKEL
JOE E. SALMON
THOMAS H. BRUGH

BY
ATTORNEY

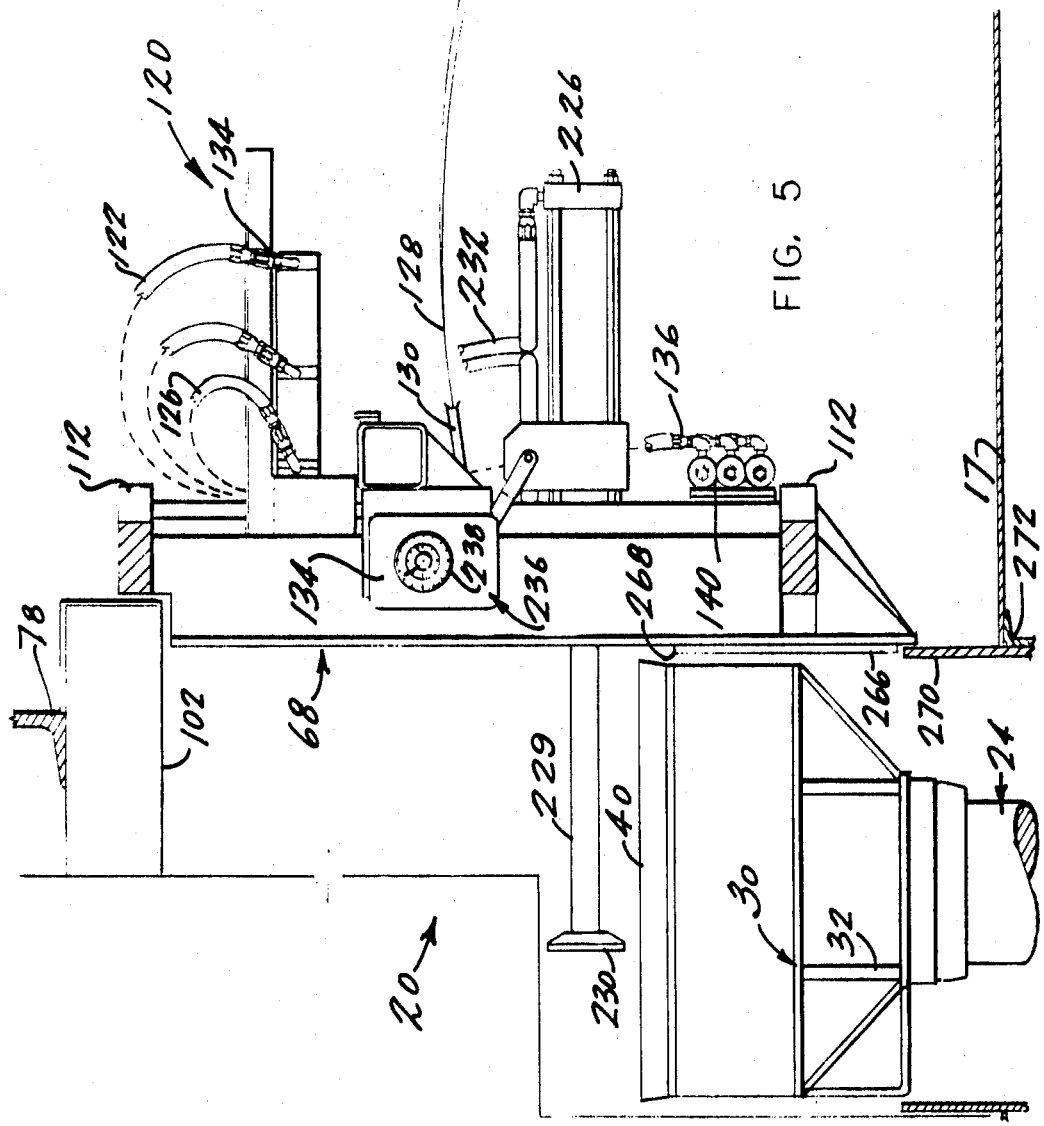

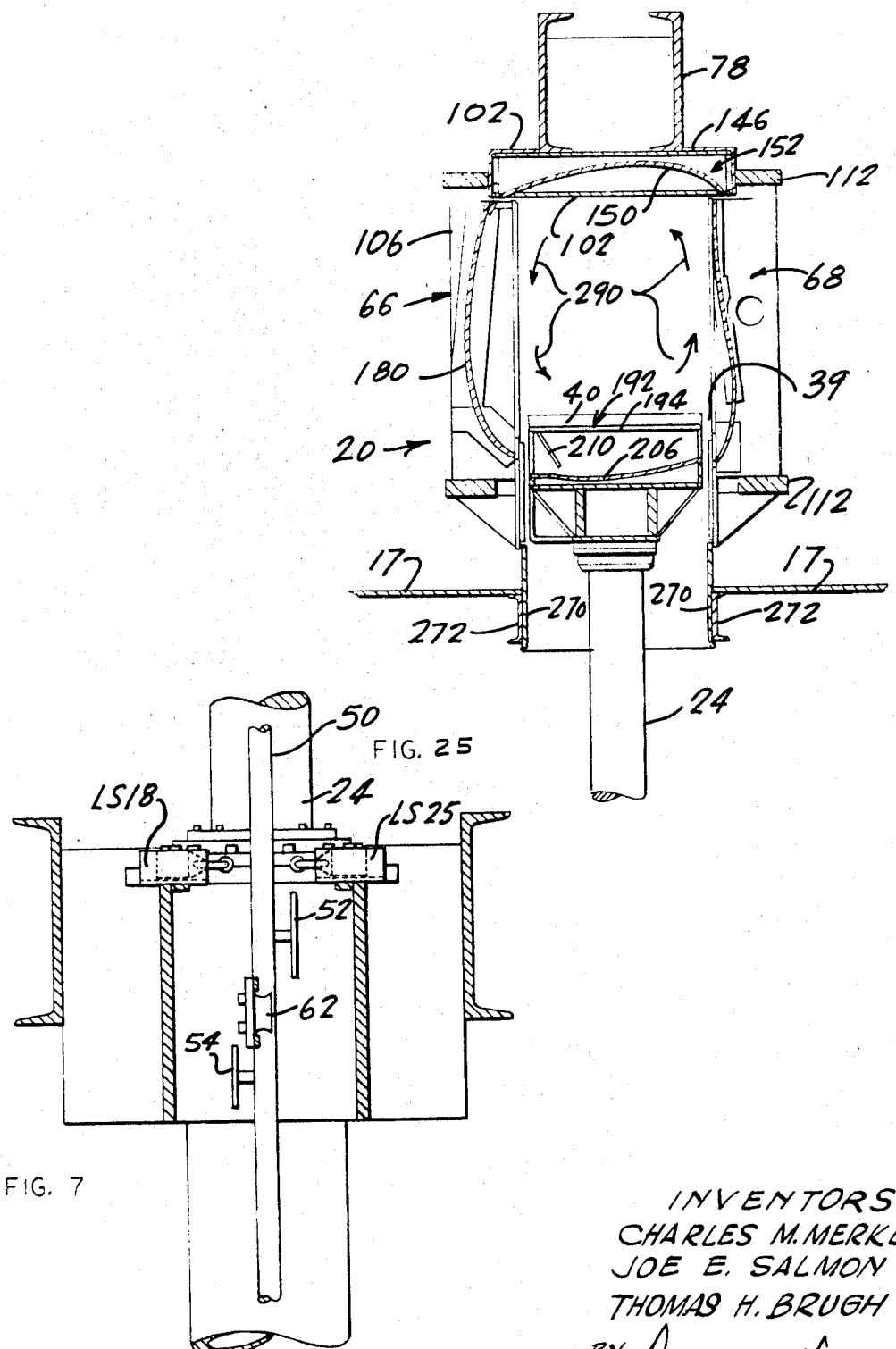

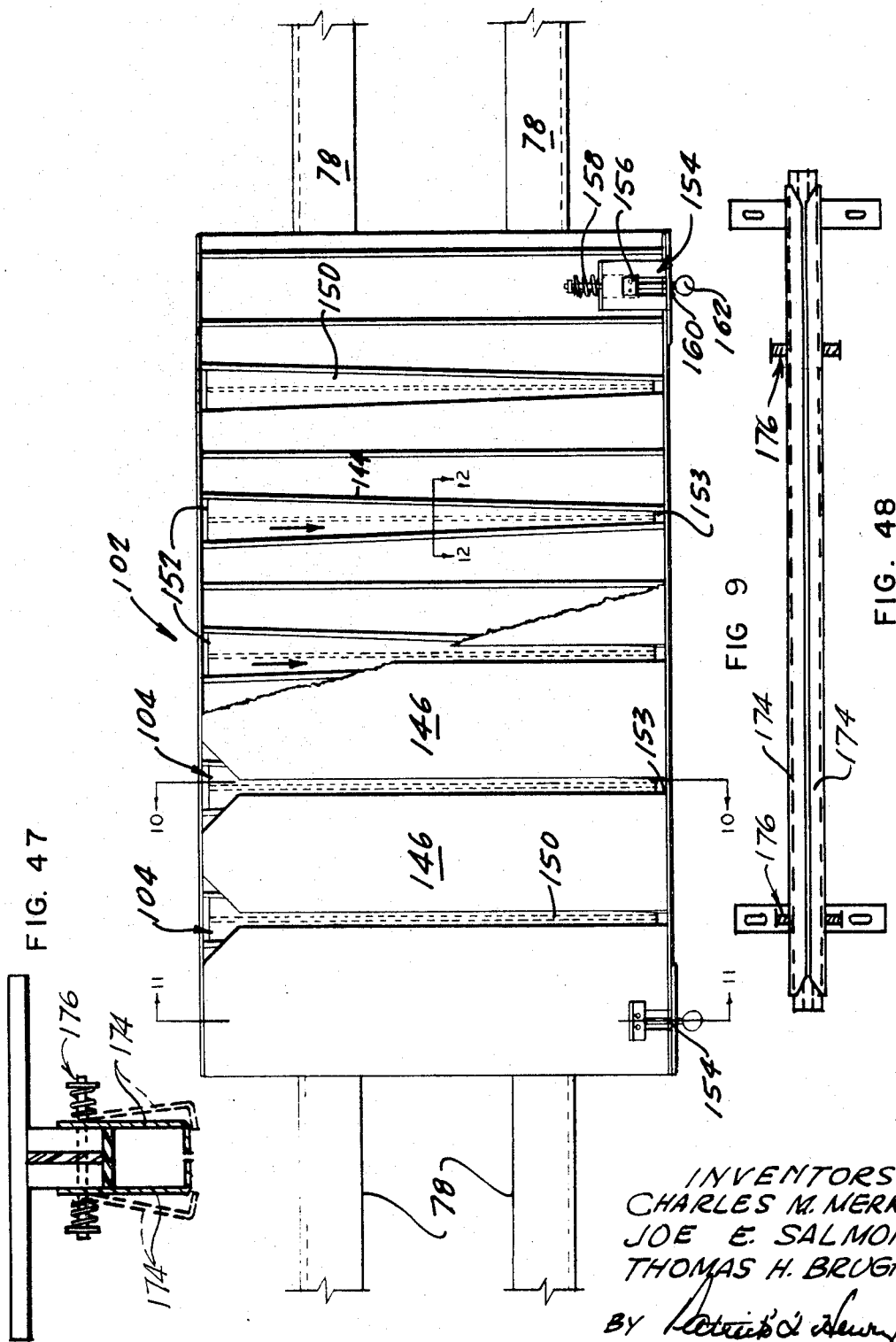

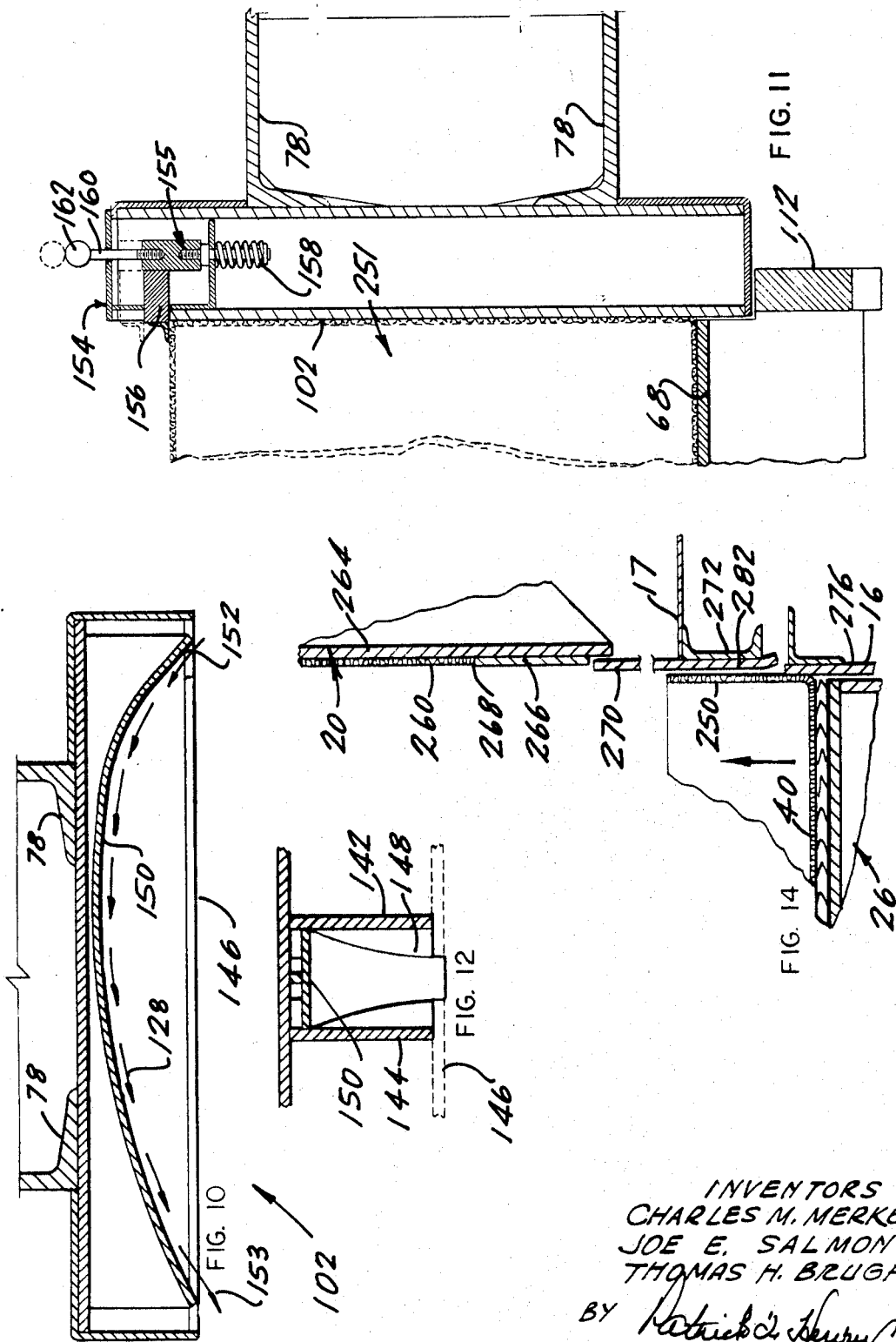

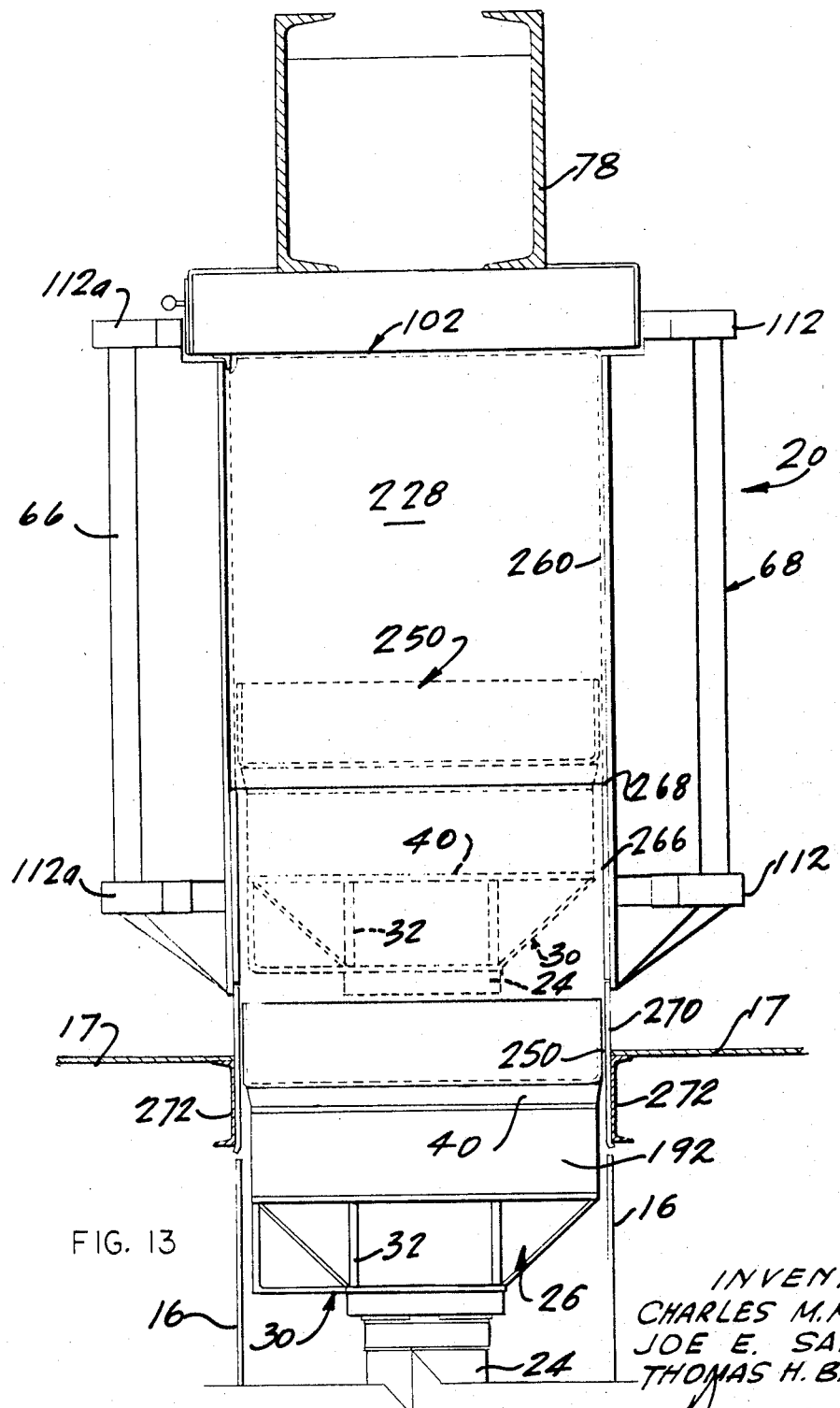

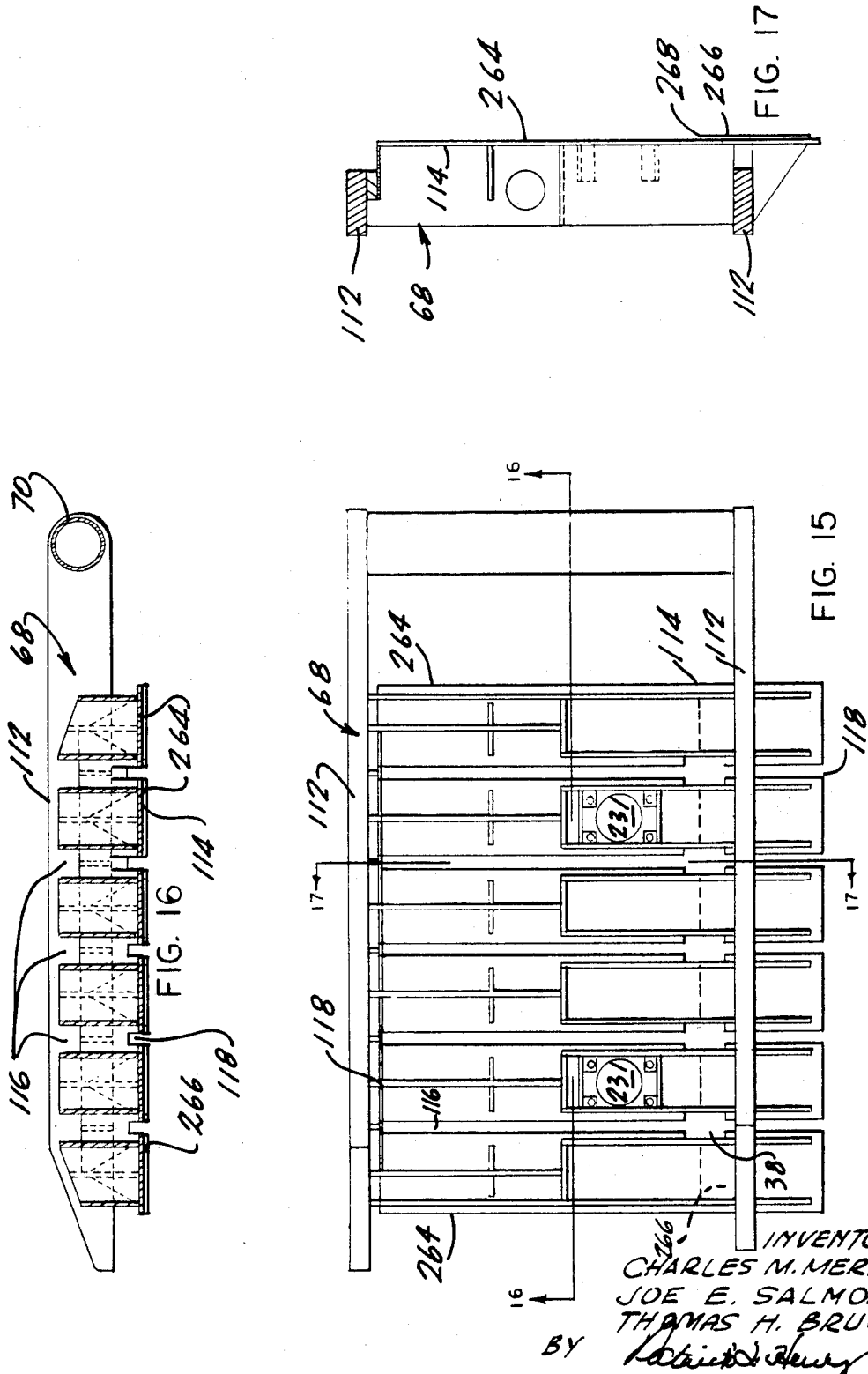

Nov. 4, 1969  C. M. MERKEL ETAL  3,475,879
APPARATUS FOR TYING A COMPRESSED BALE
Filed June 1, 1967  25 Sheets-Sheet 12
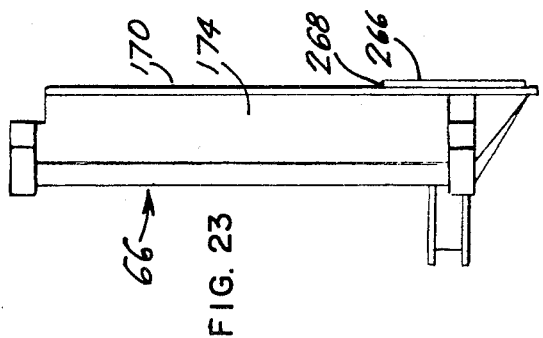
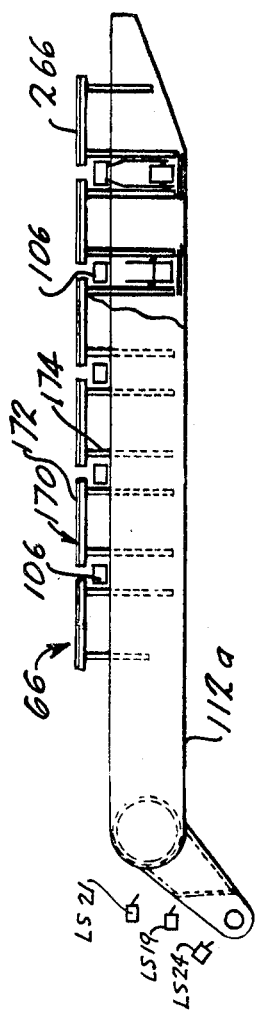
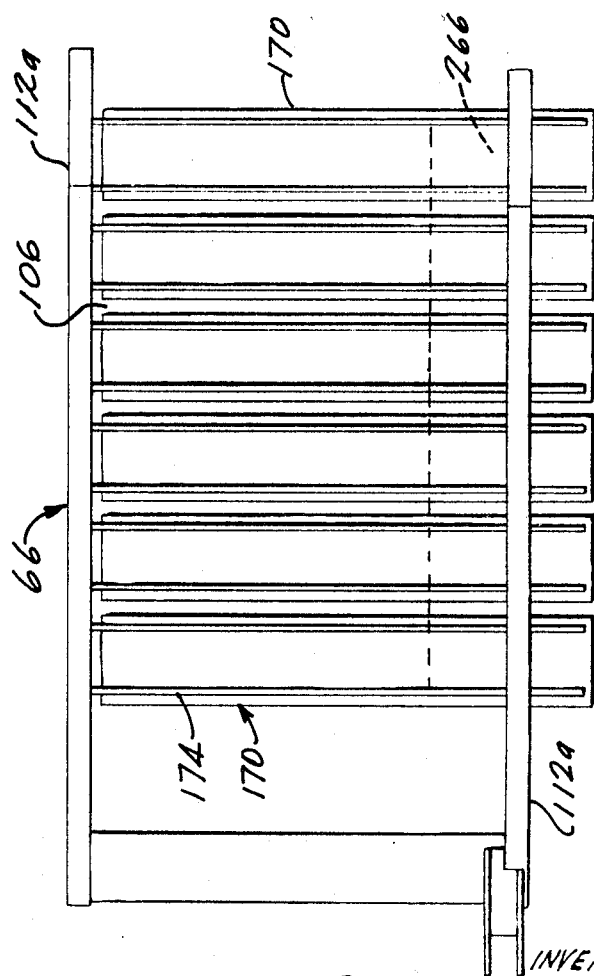
INVENTORS
CHARLES M. MERKEL
JOE E. SALMON
THOMAS H. BRUGH
BY
ATTORNEY Nov. 4, 1969         C. M. MERKEL ETAL         3,475,879
APPARATUS FOR TYING A COMPRESSED BALE
Filed June 1, 1967                              25 Sheets-Sheet 14
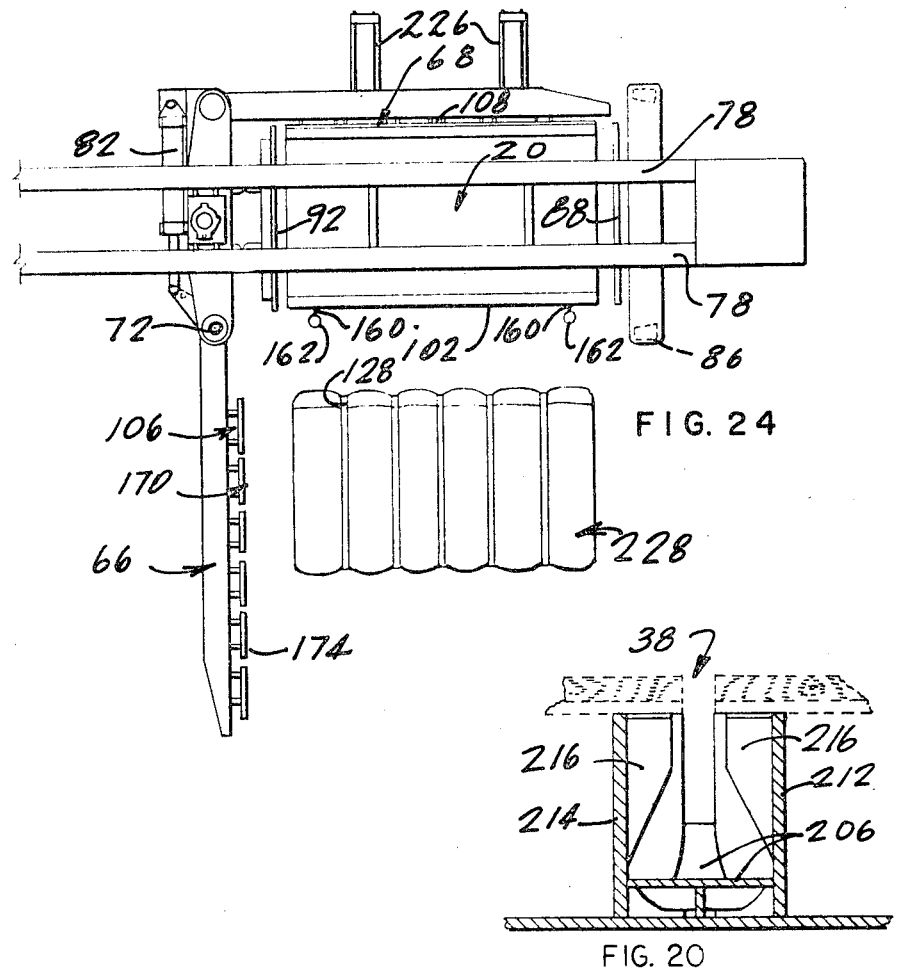
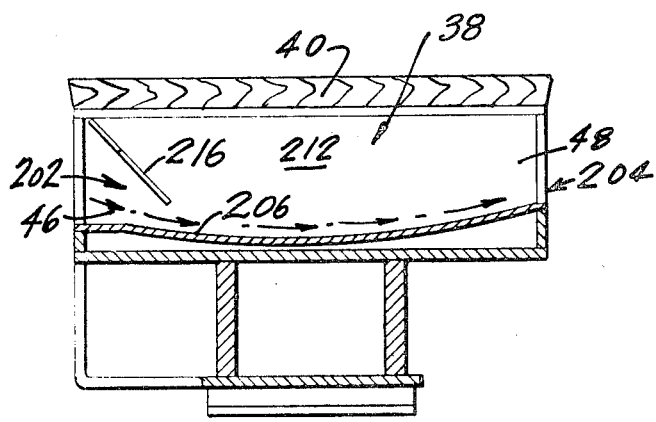
INVENTORS
CHARLES M. MERKEL
JOE E. SALMON
THOMAS H. BRUGH
BY
ATTORNEY

INVENTORS
CHARLES M. MERKEL
JOE E. SALMON
THOMAS H. BRUGH
BY
ATTORNEY

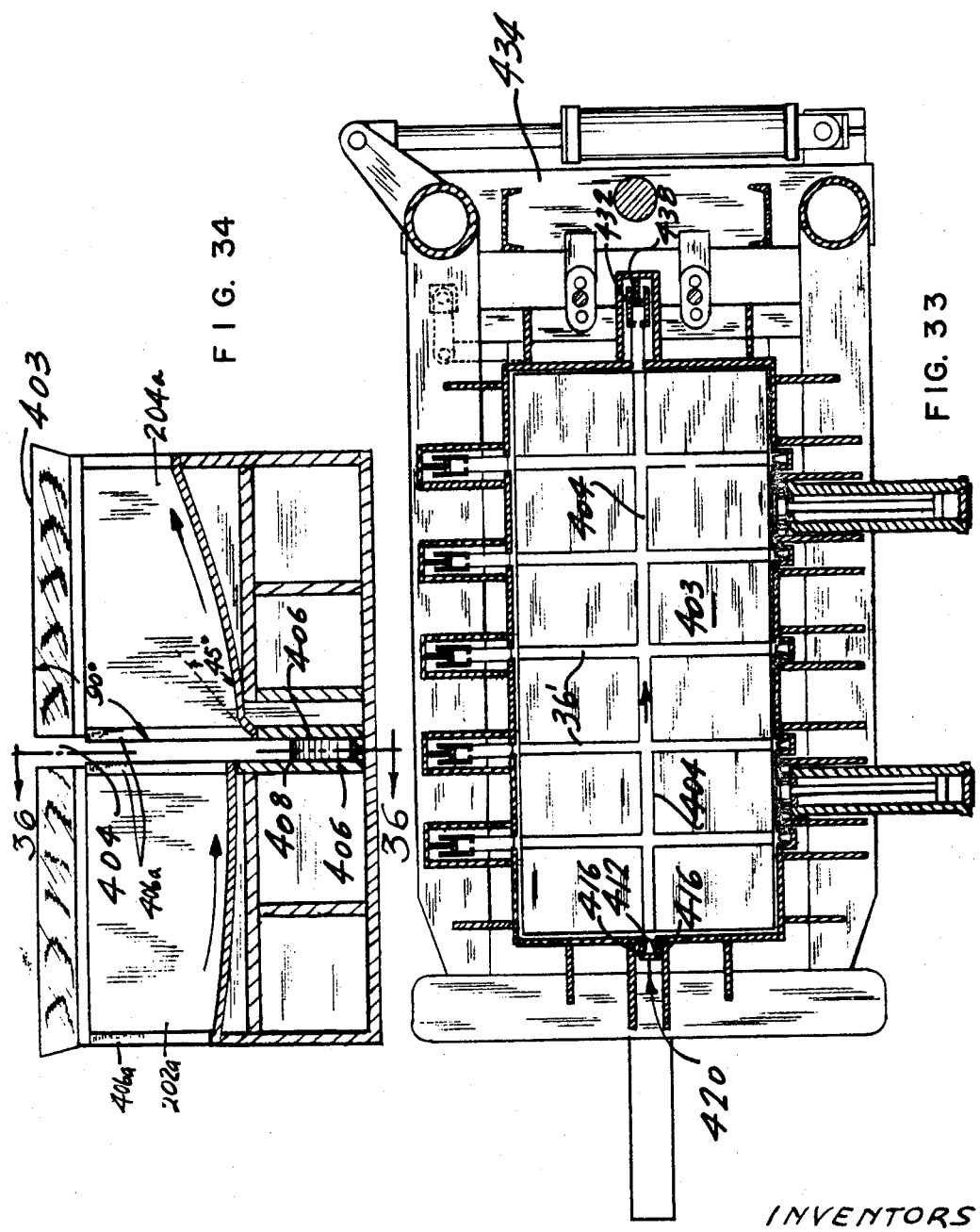

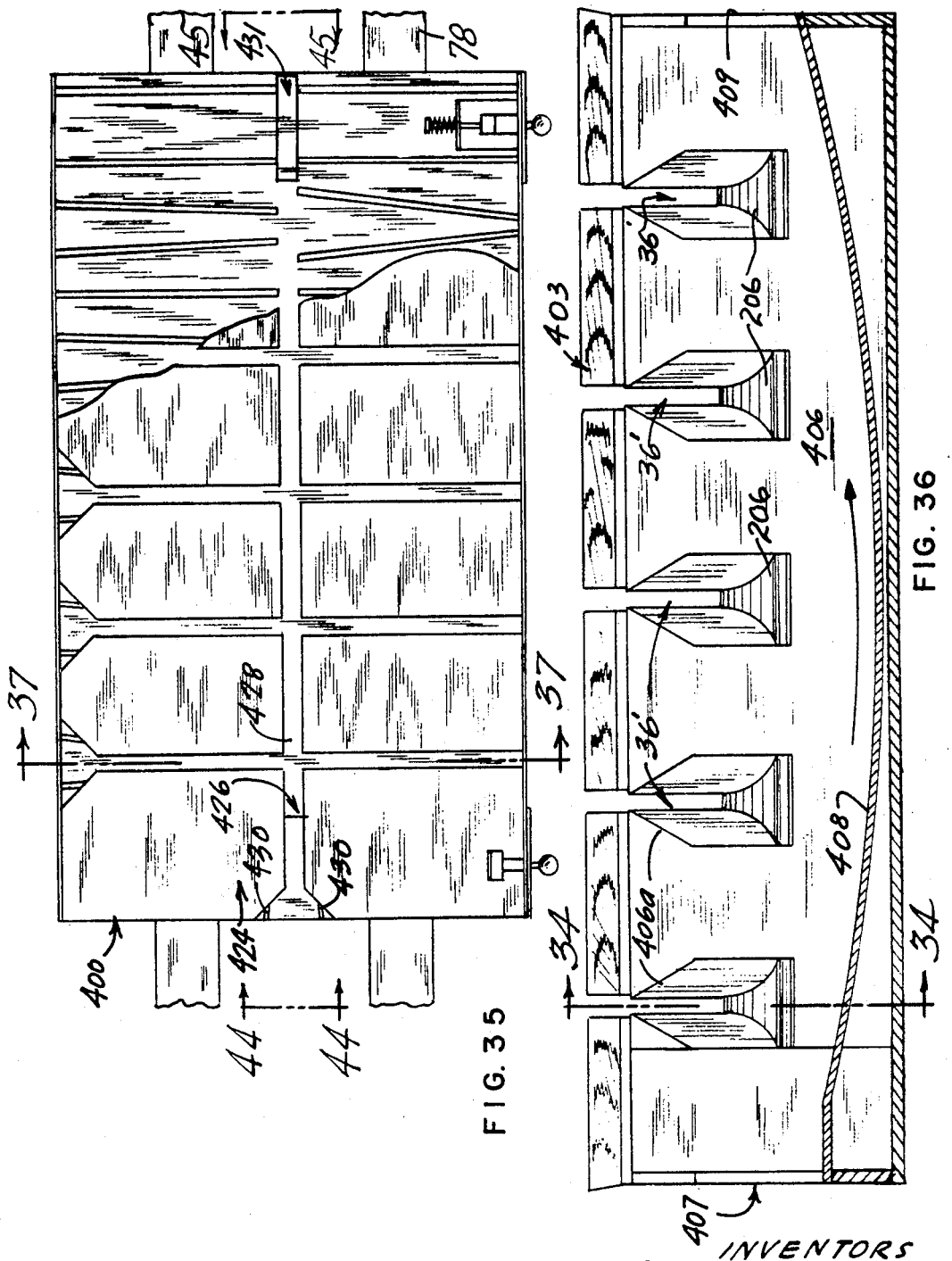

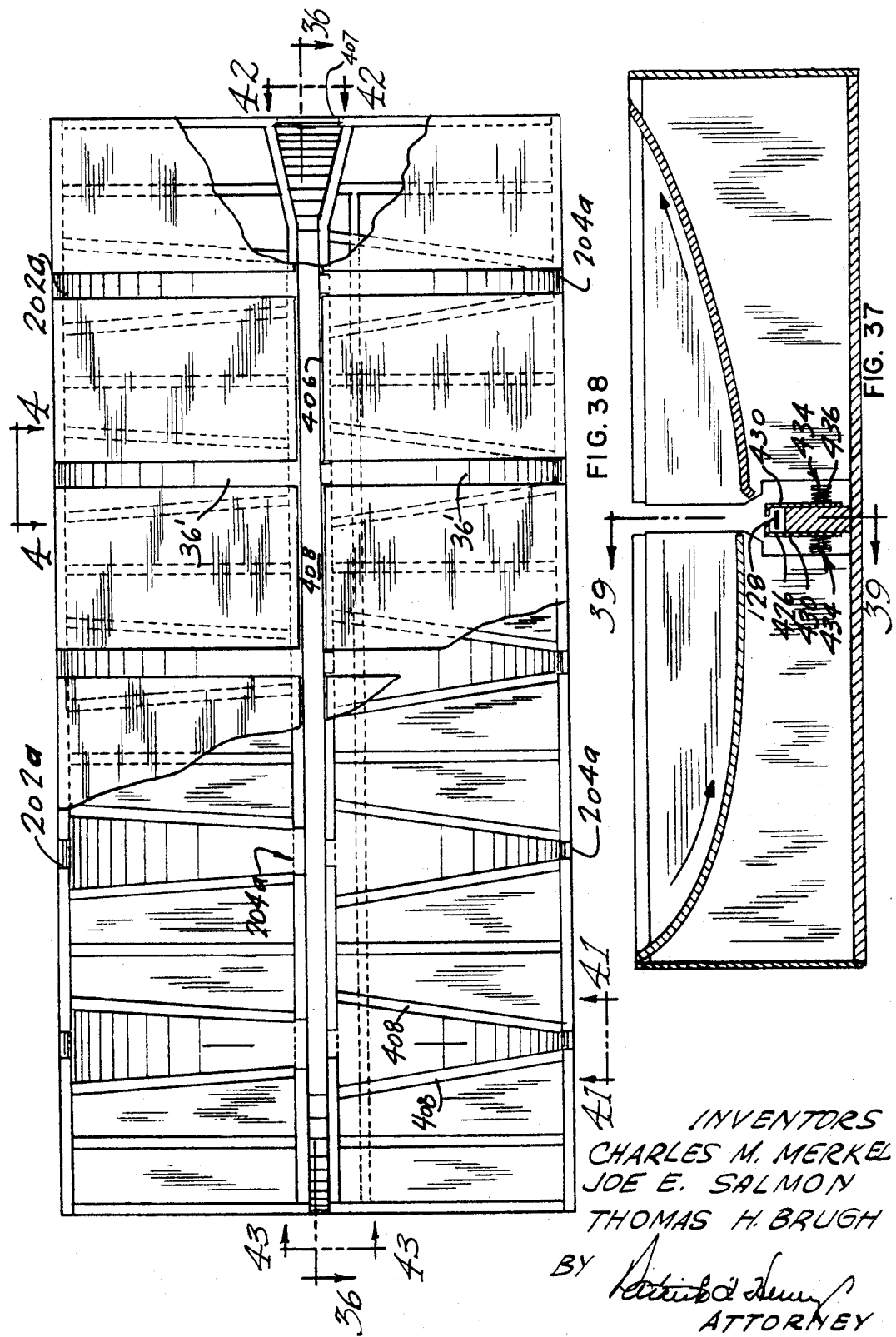

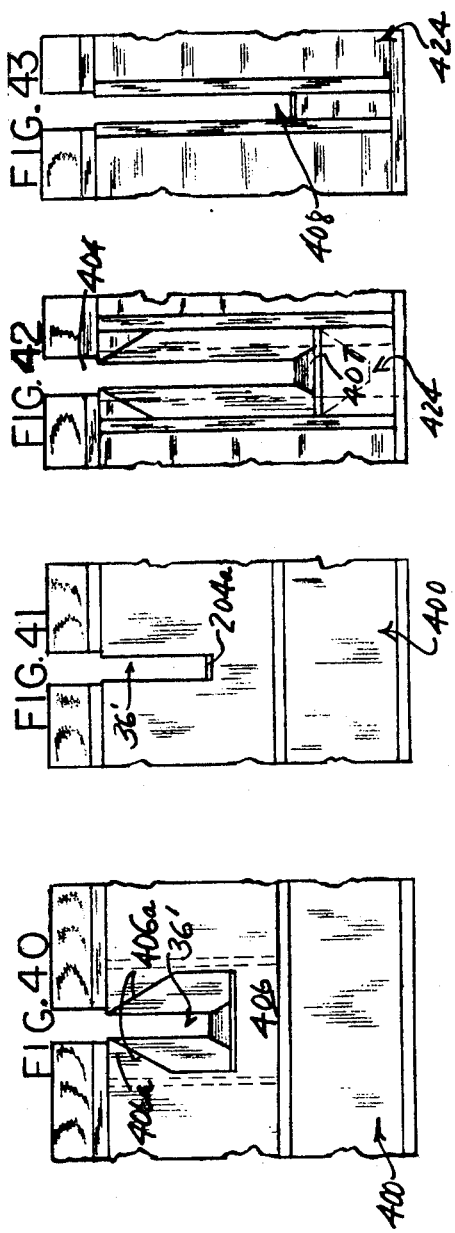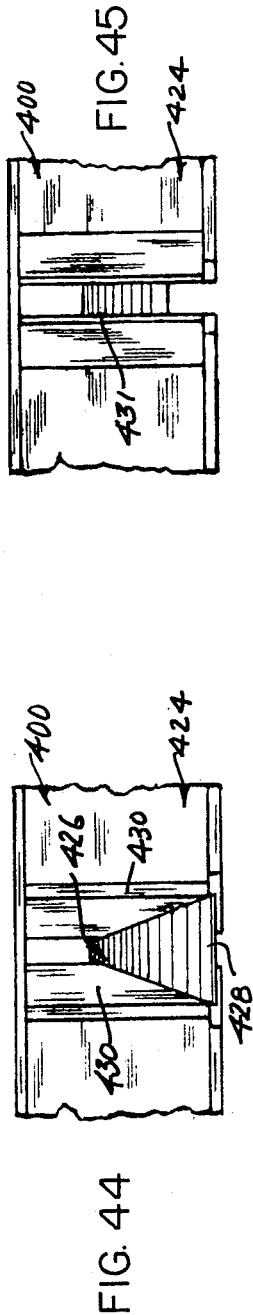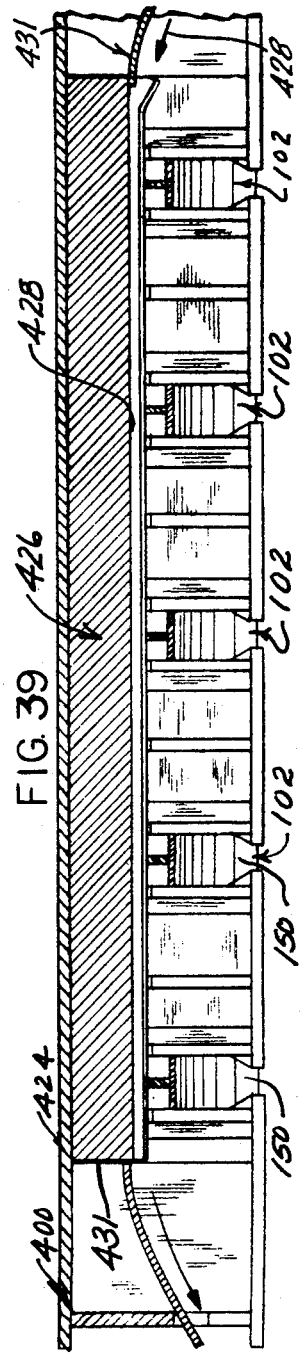

United States Patent Office 3,475,879
Patented Nov. 4, 1969

3,475,879
APPARATUS FOR TYING A COMPRESSED BALE
Charles M. Merkel, Joe E. Salmon, and Thomas H. Brugh, Pratville, Ala., assignors to Continental/Moss-Gordin, Inc., Pratville, Ala., a corporation of Delaware
Filed June 1, 1967, Ser. No. 642,770
Int. Cl. B65b *13/06, 13/20, 57/00*
U.S. Cl. 53—124
14 Claims

ABSTRACT OF THE DISCLOSURE

Apparatus for tying a compressed bale of flowable material, such as steel strapping a cotton or synthetic fiber bale that has been prepared and transferred in a fixed-box press, by directing the tying or strapping members through spaced openings on one side or wall of a baling box and guiding said members transversely around the girth of the bale inside the baling box while the walls, including any normally openable doors, remain closed. The apparatus comprises a fixed baling box which receives the tamped fiber mass, pressure means closable on said fiber mass for compressing same into a dense bale, a means such as a door on one side of the box for removing the compressed bale therefrom after strapping in the box, spaced openings along one wall of said closed box through which tying means such as a plurality of steel straps are introduced in response to force applied to the tying or strapping members themselves, and guide means inside the baling box for directing and guiding the tying members simultaneously in spaced relation around the bale and back to the incoming tying or strapping members for connection, tightening, and tying. Optionally, a modification provides a single longitudinal girth strap simultaneously with the lateral or transverse girth straps.

CROSS-REFERENCES TO RELATED APPLICATIONS

Application Ser. No. 664,338, filed Aug. 30, 1967, filed by L. P. Sauer and entitled Articulated Strapping Apparatus, which application was assigned to the Signode Steel Strapping Company, 2600 Northwestern Ave., Chicago, Ill., and application Ser. No. 791,971, filed Jan. 17, 1969 by Charles M. Merkel et al. and entitled Method for Tying a Compressed Bale, which latter application is a division of the present application.

BACKGROUND OF THE INVENTION

Field of the invention

Binding and/or pressing or compressing together and strapping a flowable mass such as cotton or synthetic fibers by means of a pressure supporting structure such as a frame or box-like arrangement into which the tying or strapping material is introduced while the mass is under pressure and without displacing the structural supports such as the walls or doors so as to restrain the flowable mass to hold same in compressed condition while applying the strapping members.

Description of the prior art

U.S. Patents Nos. 3,213,780 to J. C. Neitzel et al. and 3,220,337 to Goland et al. disclose baling apparti having a significant disadvantage of requiring that the baling apparatus doors or walls be displaced so that the separate banding structure can be moved into position to place the bands or strapping members around the bale. This requires an important time consuming separate step as it means opening part of the pressure supporting structure, such as the doors or walls. According to the present invention, a method is employed whereby the fibrous material is compressed in the baling structure and while under compression and without displacing any of the component structural supports, the tying, or strapping members are introduced through spaced openings and guided internally of the supporting structure around the compressed fibrous mass and brought back together for fastening. This eliminates at least one step of opening any doors or other structure and reduces the chances that the compressed fibrous mass may expand prior to the strapping members being securely fastened. It is important in considering prior art to recognize the difference between handling a compressible but non-flowable material like fiberboard or plywood and flowable materials such as natural or synthetic fibers that do not easily remain in place under baling pressures unless restrained on all sides.

SUMMARY OF THE INVENTION

The method disclosed herein is particularly applicable to the creation of high density bales from loose fibers or the like. A fixed-box press arrangement described in U.S. Patent 3,252,409 issued to C. M. Merkel and T. M. Brugh, co-inventors herein, improves production by preparing and tamping one mass while completing and making a bale substantially simultaneously therewith in a separate location and through the use of rotating a tamped mass to the fixed box for completion. The fixed baling box affords an excellent structure to practice the method of automatic strapping as hereinafter described, which may also be applied to other arrangements. According to the present method, after the mass has been tamped and prepared it is delivered to a fixed baling box which in one form may resemble a box with sufficient walls to support compression that takes place between a fixed support and a moving ram. After the bale has been compressed to a predetermined character such as dimension, the tying members or straps are caused to travel into the guide means through spaced openings in one of the walls and then caused to travel generally circumferentially 360 degrees around the bale to bring the tying members or straps back to position to be tensioned and secured while the bale is still under compression and while holding the same relative position of all walls comprising the baling box, until after straps are secured.

The present apparatus resembles a form of fixed-box cotton press structure similar to that shown in Merkel et al. 3,252,409 except that the internal baling box portions of the instant structure are provided with guide means in at least four walls for the purpose of guiding and directing tying or strapping members which are passed through from one side and around through spaced openings in the walls. One of the walls may be an openable door which includes "chutes" or guide means, there being one of these for each of the tying or strap members which are to be passed about the bale. The delivery of the tying or strapping means is not per se claimed as a part of this application since these have to do with power strapping means or devices or hydraulic tensioning controls for power strapping machines and bundle strapping means such as described, for example, in U.S. Patents 2,915,003 and 2,915,004 and 3,220,337. Such devices are obtainable on the market and one source is the Signode Corporation, 2600 Northwestern Ave., Chicago, Ill. 60647 (Reference Catalogue No. 23). An important inventive concept disclosed in the present apparatus is that of supporting a previously partly prepared mass of compressible material in a press structure which includes some means of getting the mass into the structure and some way of getting the mass out as by a door, and while maintaining the final forces of compression after having made the final density of the bale, without releasing same, introducing the typing means such as the steel straps around the bale by directing and guiding same inside the baling box structure without releasing the forces of compression and without opening any major pressure supporting means such as door or wall.

BRIEF DESCRIPTION OF THE DRAWINGS

Other and further objects and advantages of this invention will appear more fully from reading the following specification taken in conjunction with the accompanying drawings, in which:

FIG. 5 is an enlarged cross-sectional view taken along lines 5—5 in FIG. 3.

FIG. 7 is an enlarged cross-sectional view taken substantially along lines 7—7 in FIG. 6.

FIG. 9 is a bottom plan view looking up into the top platen of the press structure and showing the strapping member guide chutes therein.

FIG. 10 is a cross-sectional view taken substantially along lines 10—10 in FIG. 9.

FIG. 11 is a cross-sectional view taken substantially along lines 11—11 in FIG. 9.

FIG. 12 is a cross-sectional view taken substantially along lines 12—12 in FIG. 9.

FIG. 13 is a cross-sectional view taken along lines 13—13 in FIG. 1 with a carton in place shown in dotted lines.

FIG. 14 is a cross-sectional view taken substantially along lines 14—14 in FIG. 3 with the upper and lower portions of a carton in place.

FIG. 15 is an outside elevation view of the back wall of the baling box without the strap delivery means thereon.

FIG. 16 is a cross-sectional view taken substantially along lines 16—16 in FIG. 15.

FIG. 17 is a cross-sectional view taken substantially along lines 17—17 in FIG. 15.

FIG. 18 is an elevation view looking toward the outside of the movable door side of the baling box.

FIG. 20 is a cross-sectional view taken through a portion of one of the chutes or guide means for the strapping material substantially along lines 20—20 in FIG. 19.

FIG. 21 is an enlarged cross-sectional view taken substantially along lines 21—21 in FIG. 19.

FIG. 22 is a top plan view looking down on the edge of the movable door.

FIG. 23 is an end elevation view of the movable door shown in FIG. 18.

FIG. 24 is a top plan view of the baling box with the door opened and a bale ejected.

FIG. 25 is a vertical cross-sectional view taken transversely through the baling box along line 25—25 of FIG. 1 with the strap delivery device removed.

FIG. 33 is a horizontal cross-sectional view taken substantially along lines 33—33 in FIG. 31.

FIG. 34 is a cross-sectional view taken substantially along lines 34—34 in FIG. 36.

FIG. 35 is a plan view of the inside of the modified top platen assembly with parts broken away showing the guide chutes.

FIG. 36 is a cross-sectional view taken along lines 36—36 in FIG. 38.

FIG. 37 is a cross-sectional view taken along lines 37—37 in FIG. 35.

FIG. 38 is a plan view of the inside of the modified follower block assembly.

FIG. 39 is a view of the guide chute taken in the direction of 39—39 in FIG. 38.

FIG. 40 is a view taken in the direction of 40—40 in FIG. 38.

FIG. 41 is a view taken along lines 41—41 in FIG. 38.

FIG. 42 is a view taken along lines 42—42 in FIG. 38.

FIG. 43 is a view taken along lines 43—43 in FIG. 38.

FIG. 44 is a view taken along lines 44—44 in FIG. 35.

FIG. 45 is a view taken along lines 45—45 in FIG. 35.

FIG. 47 is an end elevation view of the arrangement shown in FIG. 46.

FIG. 48 is a top plan view of the arrangement shown in FIG. 46.

DESCRIPTION OF THE PREFERRED EMBODIMENT

Figure 1:
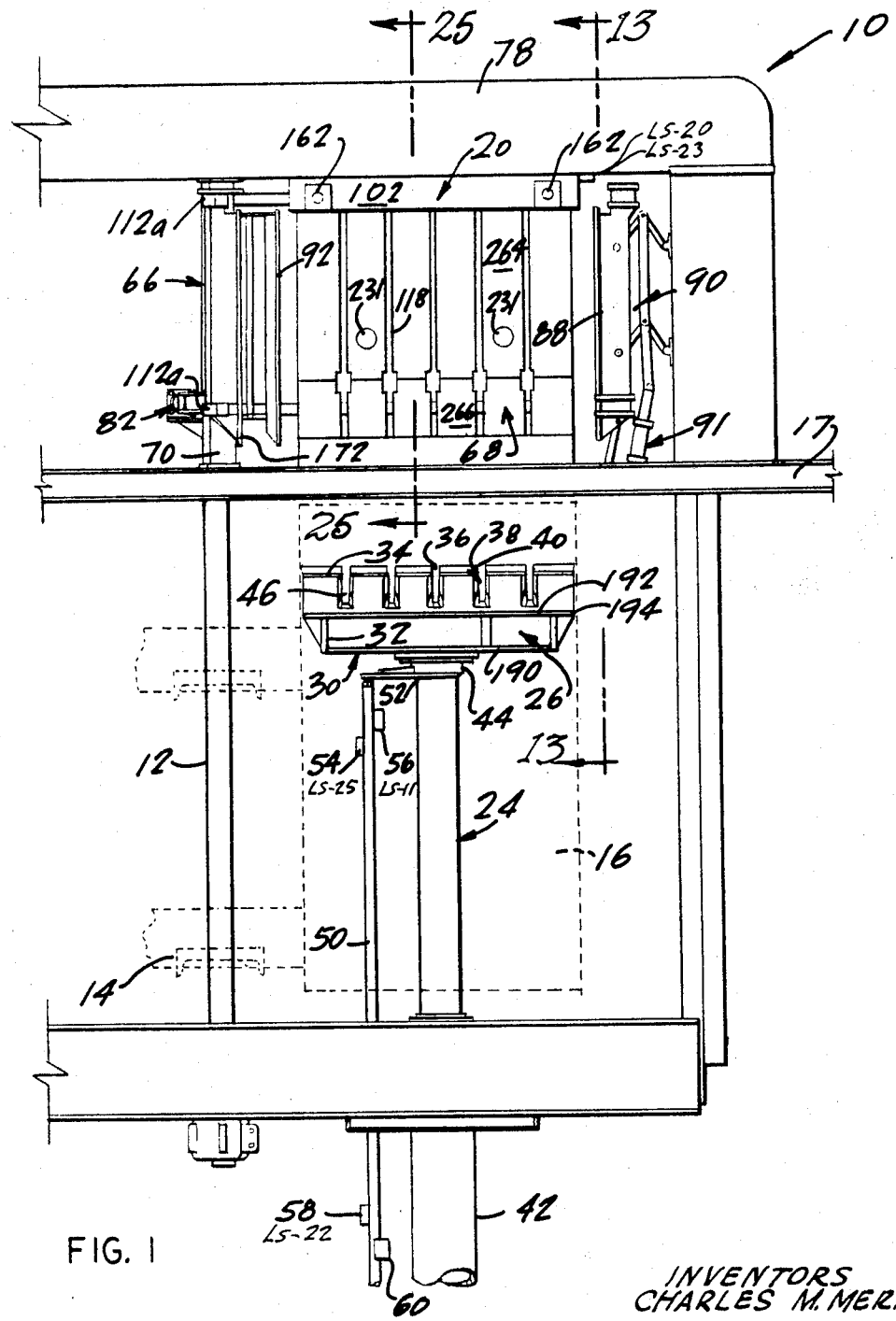
FIG. 1 is a front elevation view of the press structure of the present invention with the front wall open and end walls retracted and including a portion of the follower block and the bale-making ram or hydraulic piston.

Referring to the drawing and also with reference to the drawings and description in Patent No. 3,252,409, mentioned previously, and which discloses a type of fixed-box cotton press which may be provided with the present invention and to this extent the present invention comprises a frame designated generally by reference numeral 10 having a center column 12 which rotatably supports a second frame unit 14 carrying boxes 16 (and the other box which is not shown herein) which, as described fully in the above noted patent to Merkel et al. 3,252,409, are not baling boxes but are boxes that receive fibers or cotton to be baled in one position and to be conveyed to a second position whereat the fiber or cotton is removed from the pertaining box and is compressed in a baling box fixed in the frame and separate from boxes 16 (and the one not shown) and which is designated in the present application generally by reference numeral 20. Baling box 20 is fixed in the frame and located above the box 16 and above the floor 17 when the press is partially submerged below the floor. Floor 17 could also be a walking deck around the baling box 20 and other apparatus not forming a part of the present invention. According to the operation of this prior art, one box is in fiber receiving position to receive fiber that is tramped and partly compressed by a tramper foot (not shown) actuated by any suitable means (not shown) such being described fully in the above noted patent. During the time that one box is being filled and tramped, the other box 16 is in position as shown in dotted line in the present drawings in FIGS. 1 and 2 and the fibers in the box 16 located beneath the baling box 20 are pushed by means of a baling ram assembly 24, having a follower block assembly 26 thereon, into the baling box 20 for final compression and tying or strapping.

The follower block assembly 26 has been modified as will be described later but it still includes a frame 30 composed of vertical, horizontal and diagonal frame members 32 suitably connected together and a plurality of flat plates 34 spaced to form a normally horizontal flat support on top of the frame 30 with slots or spaces 36 therebetween and in which are mounted the bottom, horizontal guide chutes 38 for the strapping material. The top of the plates 34 each is covered by a platform member 40 which may be of wood. Frame 30 is lifted by the baling ram assembly 24 which includes a large cylinder 42 hydraulically operated to drive the upper portion 44 with the follower block assembly 26 thereon which acts as a support platform or pallet for the bale. Chutes 38 have an entrance 46 and an exit 48.

Traveling with the ram assembly 24 is a control rod 50 which has the upper end attached to a plate 52 mounted on the ram assembly 24. The control rod has a pair of upper control actuating members 54, 56 and a pair of lower control actuating members 58, 60 which contact for purposes of safety and automatic control as will appear hereinafter. The operation of control rod 50 and the actuating members 54, 56, 58 and 60 will be mentioned later.

Baling box 20 in many respects is the same as described in the Merkel Patent 3,252,409. It is an extremely strong structure designed to withstand tremendous forces of the final compression of a bale to its ultimate size and to hold this compression while the strapping means is being applied. It should be understood that any structural means which interrupts an open space is generally a wall or a side and the baling box 20 is a structure which comprises walls that close to compress a bale. For sake of identification certain walls or structures are identified as end walls, side walls, top and bottom but these are relative and changeable expressions depending upon the type of press being used and the direction the bale is brought in and removed. Furthermore, the expression "door" generally refers to a wall or side which can be moved out of position but in the present device all walls or sides can be removed for repair or maintenance. However, the baling box 20 has front and back walls 66, 68 respectively and wall 66 is a door pivotally supported on a column 70 which includes hinges 72. The side or door 66 is operated by means of a hydraulic cylinder with piston arrangement 82 actuated manually electrically or in sequence as described hereinafter.

As described in the Merkel Patent 3,252,409, the ends of the front and back walls 66, 68 respectively may be tapered and provided with a wedging device 86 so that the aforementioned walls can be wedged in closed position. To this extent the wedging device 86 also carries one wall 88. The connection and operation by means of a toggle arrangement 90 and fluid motor 91 is described in the Merkel patent.

At the opposite end of the baling box 20 from the end wall 88 there is another end wall door 92 which is constructed and supported by linkage means as described in the Merkel patent. In accordance with this arrangement, end wall door 92 is caused to move away from the interior of the baling box 20 when the door 66 is opened. The press box construction is such that high pressures can be developed therein. All of the wall parts including the front and back doors, end walls, top and bottom (which is the platform 40) can be withdrawn and at least the door 66 can be swung open to permit removal of the bale. In the Merkel patent (as well as other prior art devices) the doors were swung open to permit banding of the bale. After the tying was completed the pressure was removed by retracting the ram and the tamping boxes were exchanged or rotated for a new cycle. However, in the present invention, it is unnecessary to open any of the doors, walls, top or bottom, for the purpose of tying since tying or strapping is accomplished automatically upon completion of the compression without moving any of the walls or opening any doors whatever.

BALING BOX STRUCTURE

The baling box 20 has a wall across the top called a platen and designated generally by reference numeral 102 which comprises structural members and is supported above by means of the large heavy beam 78. The internal plan looking upwardly into the top wall 102 is shown in FIG. 9.

In accordance with the present invention, strapping members such as flexible, self-supporting steel strap of the sort sold and distributed by the Signode Corporation, Strapping Division, Chicago, Ill. 60647, is introduced through guide means in the form of chutes or channels 103 at spaced positions across the side 68, through individual guide means in the form of channels or chutes 104 across the platen 102, through other individual guide means in the form of channels or chutes 106 in the door 66, through the guide chutes 38 in the platform members 40 on the frame 30 and back to the point of origin at the steel strapping apparatus on the door 68 at which time it is automatically tensioned by backdrawing in accordance with well established methods, principle and apparatus known in the art of steel strapping through the use of steel strapping or tensioning devices such as those shown in U.S. Patents 2,915,003; 2,915,004; 3,220,337 and 3,279,354 as well as the copending patent application assigned to the Signode Corporation mentioned in the beginning.

Figure 3:
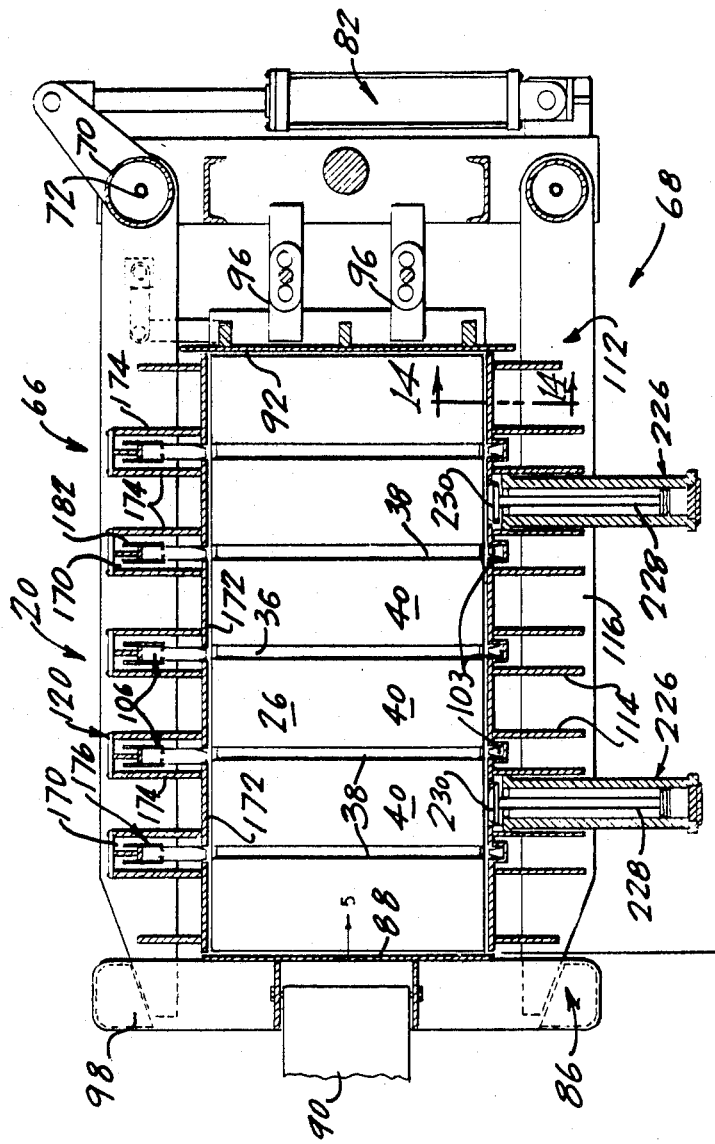
FIG. 3 is a cross-sectional view taken substantially along lines 3—3 in FIG. 2.
Figure 4:
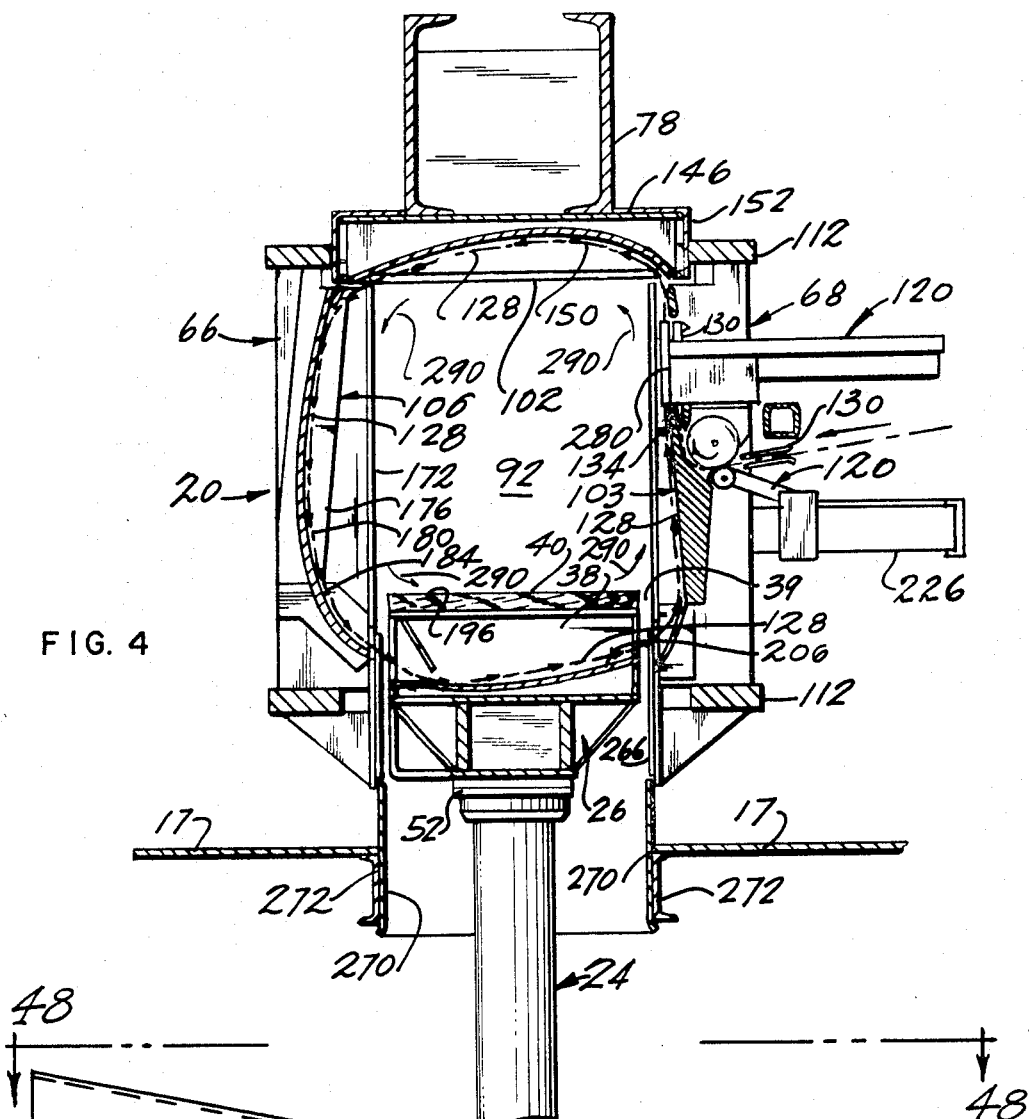
FIG. 4 is an enlarged cross-sectional view taken substantially along lines 4—4 in FIG. 2.

Referring initially to FIGS. 3, 4 and 5, wall 68 is normally closed but may be opened for servicing and is wedged in place in accordance with the previous description and reference. Wall 68 comprises longitudinal members 112 having a plurality of spaced, channel-like frame members 114 and plates 264 connected thereto forming a wall structure and as seen in the outside view of FIG. 15 there are spaces between adjacent channels 114 designated by reference numeral 116 and small slots 118 between plates 264 through which steel strapping material is fed into guide means 103.

Referring to FIG. 5 it is seen that hydraulically operated steel strapping devices indicated generally at 120 mentioned previously as subject matter of separate patent application bolted or otherwise are mounted on wall 68 and supplied. These are controlled manually or automatically in the electrical control circuit operation. In the present embodiment there are five stations through which steel strap 128 may be introduced through sleeves 130 and there are five corresponding steel strapping devices 120 as well as corresponding steel strapping backdrawing and tying apparatus 134 having hoses 136 leading thereto and being connected in the vicinity of slots 138. A manifold arrangement 140 extends all the way across the wall 66 and receives hydraulic fluid from an outside source and delivers same through the hoses 122, 124, 126.

Openings 116 lead to respective chutes 103 in door 68 then into channels or chutes 104 in the platen 102 and the steel strapping material is directed respectively through these guide means. As seen in FIG. 9, guide means 104 has slots and comprise spaced heavy plates 144 attached to the inside top plates 146 having spaces therebetween in which is mounted an arcuate plate 150 curved to provide a large opening at the entrances and exists 152 and 153, respectively, but close to the plate 146 so as to place a bend or a curve in the steel strapping material and to prepare it to make a turn or bend of approximately 90 degrees at the left hand side of FIG. 10 to lead into the front, openable door 66 and the slots or chutes 106 therein which may be seen in FIG. 4. Also, the relationship of all the slots or chutes for guiding the strapping material in all other walls may be readily seen in FIG. 4.

It will also be noticed in FIG. 9 and FIG. 12 that the chutes or slots 104 taper from the entrance at 152 inwardly and narrower at the exit 153 so as to center the steel strapping material more closely as it makes the turn and enters the wider door chutes 106. This feature prevents the leading end of the strap from catching on an edge of the entrance walls.

A pair of spring clamping devices 154, 158 are located with each on opposite ends of the platen 102 and each includes a retractable clamping member 156 actuated against a coilspring 158 on a manually operated control shaft 160 with knob 162 for clamping in place the upper portion of a box 260 into which the bale is pressed prior to banding or strapping, as shown also in FIG. 11 and described more fully later.

The steel strapping members 128 are directed from plate 150 of the exit 153 in the platen 102 into the door 66 and into a respective guide means for each of the straps corresponding to each of the individual means for each steel strap 128.

Figure 19:
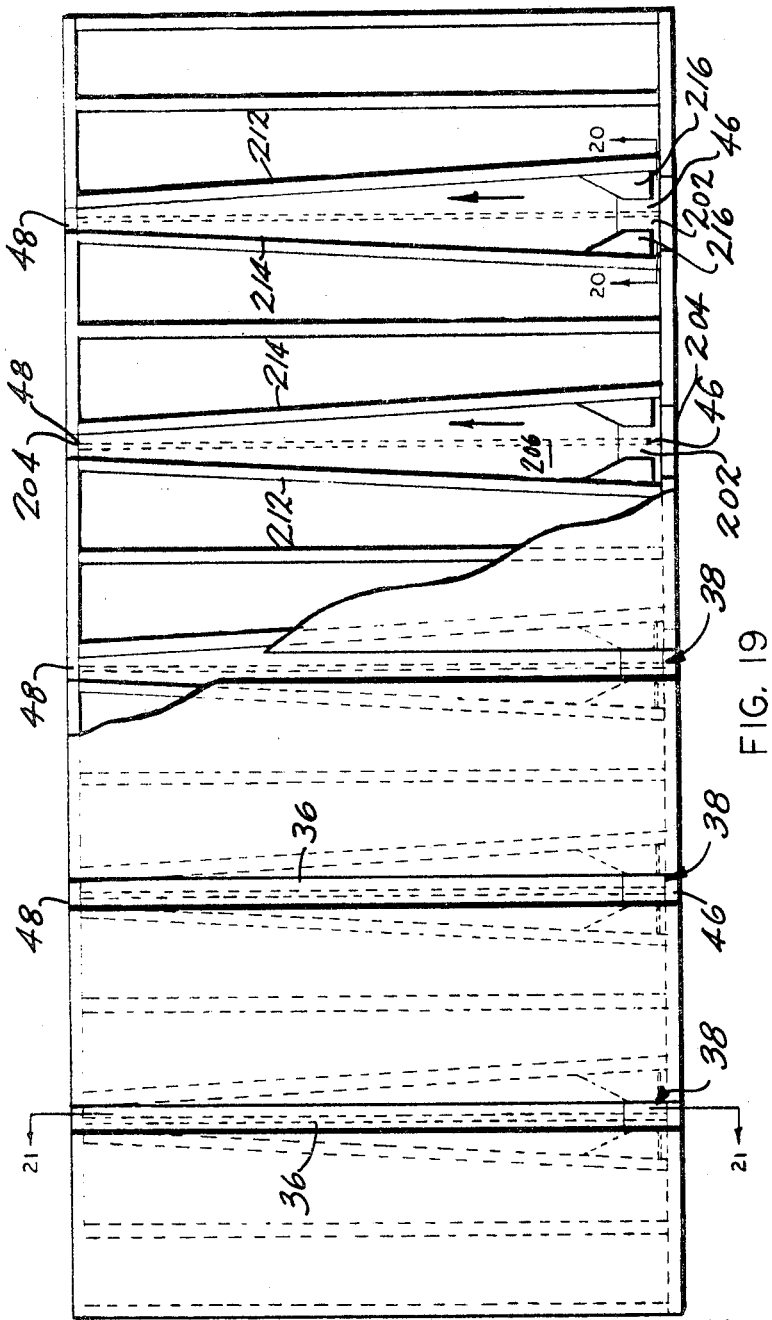
FIG. 19 is a top plan view of the top of the follower block with portions removed to show walls of guide chutes.
Figure 26:
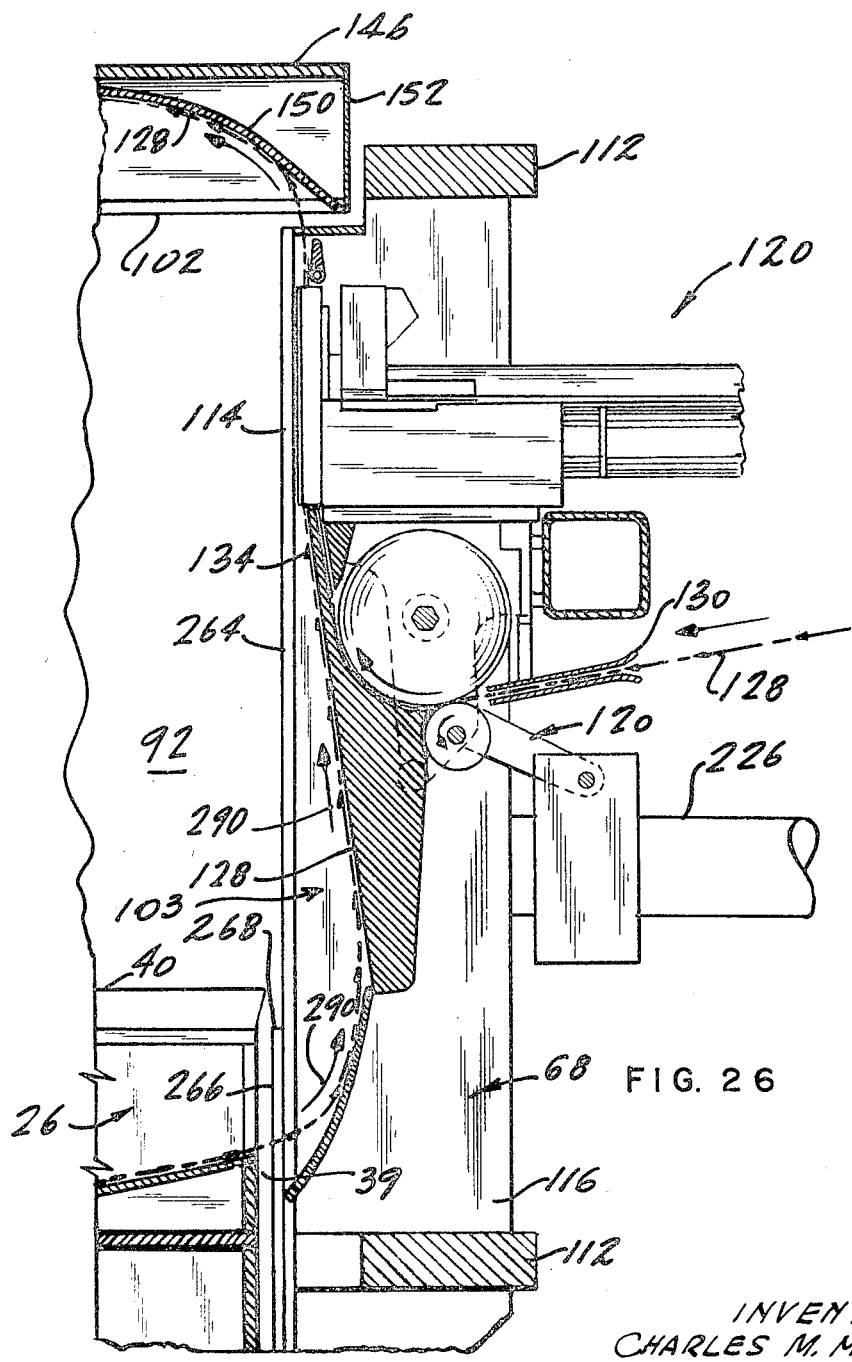
FIG. 26 is an enlarged cross-section view of the strap introduction side of the baling box.
Figure 27:
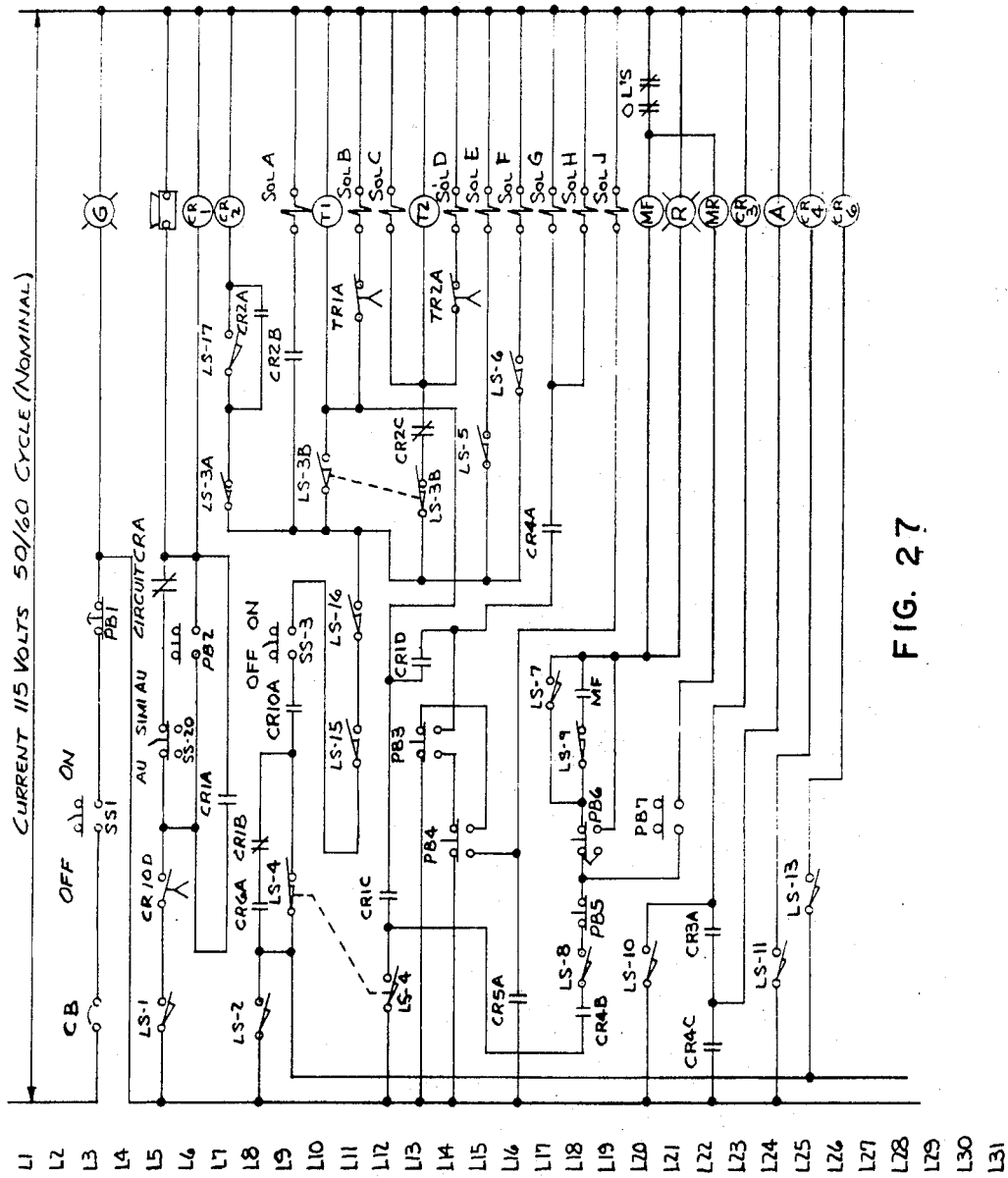
FIG. 27 is the first of four sequential, schematic electrical diagrams having marginal legends to show location.
Figure 28:
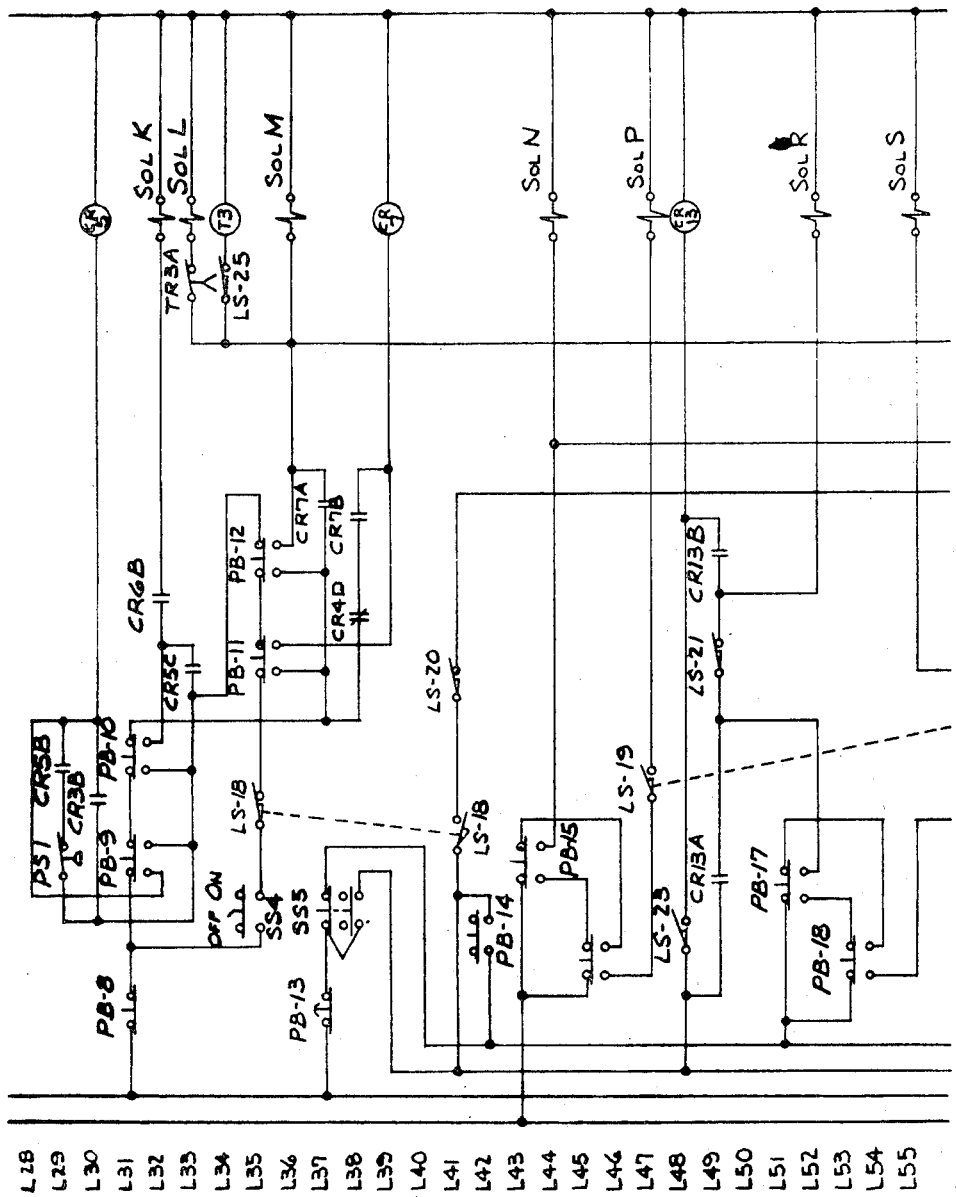
FIG. 28 is the second of the electrical diagrams.
Figure 29:
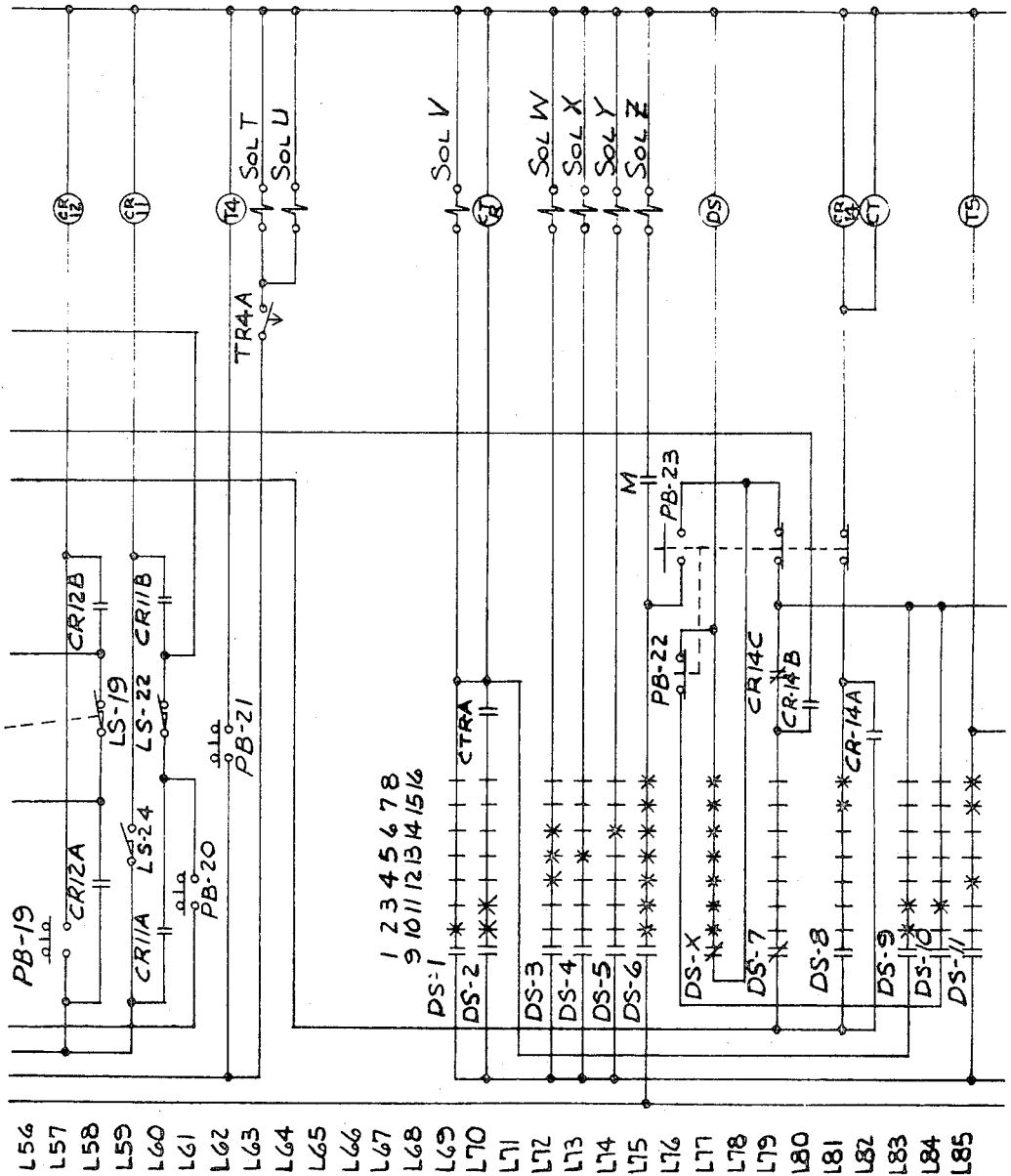
FIG. 29 is the third of the electrical diagrams.
Figure 30:
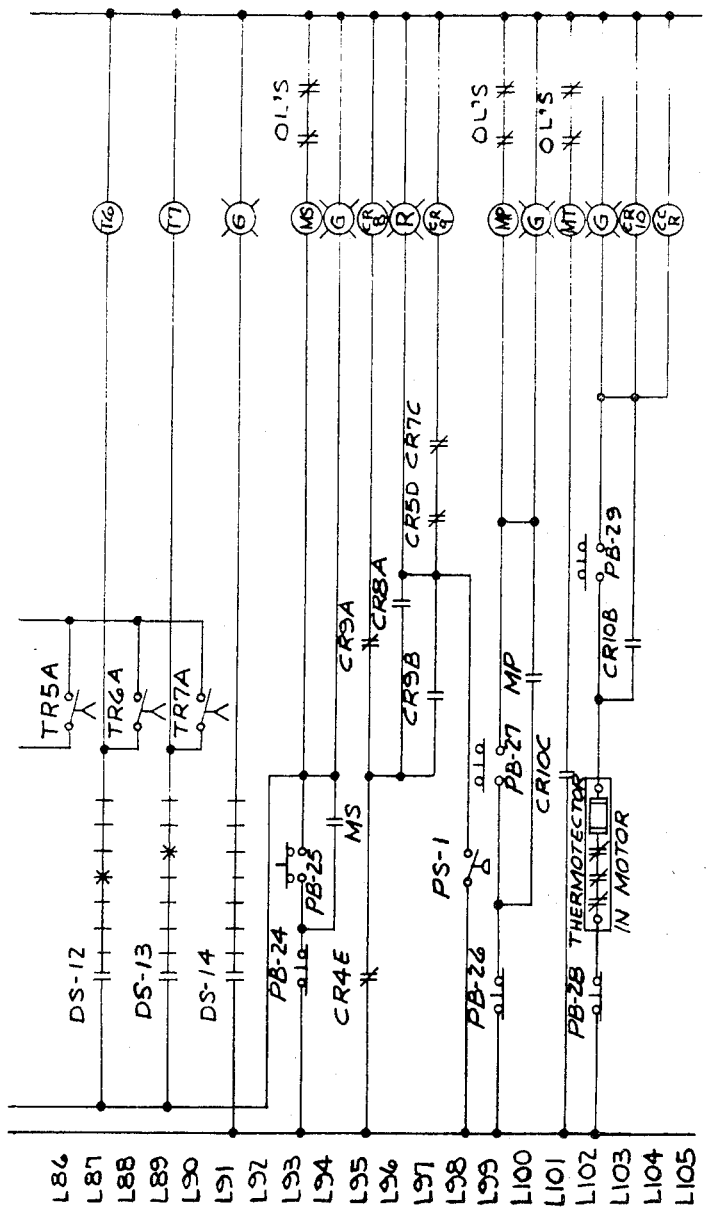
FIG. 30 is the fourth and last of the four sequential electrical diagrams.

The individual guide means 106 in wall 66 comprises a channel 170 having a flat bale supporting plate 172 and a pair of opposed, spaced web plates 174 defining the channel 170 inside the wall 66 and there being, in the present embodiment, five such channels corresponding with the five guide means in the platen 102 and in the back wall 68. Referring to FIGS. 3, 4, 18 and 22, it is seen that inside of each channel 170 has a spring arrangement 176 comprising resilient, spring members defining a curved strap guide member 180 with resilient guide sides 182 which near the bottom portion at a curved area 184 directs the strapping material out of the guide means 182 and out of the wall 66 into the corresponding, respective strap guide means designated generally by reference numeral 38 in the platform or pallet of the follower block assembly 26 as seen in FIGS. 4, 19, 20 and other figures.

The platform or pallet assembly 192 on top of the frame 30 of the follower block assembly 26 comprises a frame support generally like a rectangular box having a steel platform 194 on the top covered by spaced, heavy boards 40 or other material to create a pallet or platform structure suitable for supporting a bale and particularly for supporting a cardboard or other material carton in which the fiber is baled in accordance with some present-day practice. Beneath the platform 192 is a plurality of side-by-side channels or guide means corresponding with a respective strap guide means 106, 180, etc., in the wall 66 and similarly with strap guide means 104 in the platen 102. There are five in the present embodiment. As seen in FIGS. 4 and 21, each strap guide chute designated generally by reference numeral 38 comprises an entrance 202 and an exit 204 and a curved or arcuate guide plate 206. Each guide chute 38 includes a pair of side walls 212, 214 which taper or converge from the entrance 202 toward the exit 204. At the entrance 202 there is a special deflector and guide apparatus comprising a pair of alignment segments 216, shown in FIGS. 19 and 20, attached to the tapered walls 212 and 214 of the chute 38 thereby aiding in bringing the strap into the strap guide chutes 38 from wall 66 and to center strap in chute 38 during tensioning. At the wall 68 in each guide chute 118 the strap 128 is directed into the strap backdrawing and turning apparatus and heads 134 whereat each strap 128 is pulled hydraulically by the mechanism which does not per se form a part of the present invention and which is referred to previously herein with respect to prior art patents and the Signode Corporation, and which is a mechanism that pulls the loose strap while holding the supply end so as to tightly band the strap around the bale while it is under compression and then to place a clip or strapping seal (not shown) on the band to hold the band together against great forces of compression and then to cut the steel strap away from the bale and permit the steel strap to continue onto the strap supplying heads for use on the next bale.

Figure 2:
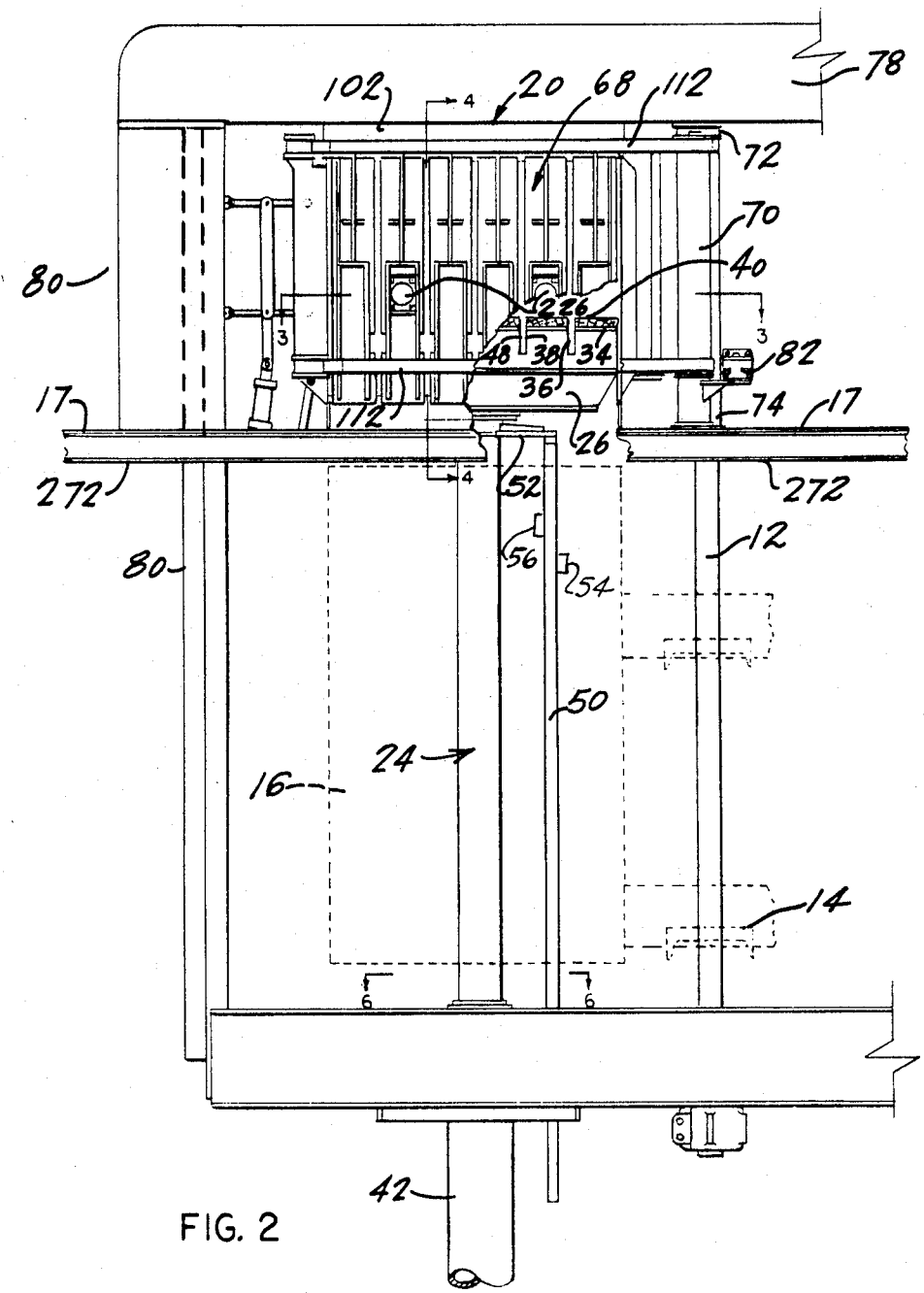
FIG. 2 is a rear elevation view of the structure shown in FIG. 1 with the walls closed and follower block in tying position as shown partly in broken section.

On the wall 68, as readily seen in FIGS. 2, 3 and 5, there is a pair of hydraulic piston and cylinder bale ejectors designated generally by reference numeral 226 and including an extendible and retractable piston 229 with a smooth bumper 230 on the outward end which is used as seen in FIGS. 5 and 24, for ejecting the bale 228 after it has been strapped and banded and after door 66 is opened for removal of bale 228. The hydraulic bale ejector 226 is attached to spaced positions on the wall 68 and operates through holes 231 to eject the finished bale 228. Hoses 232 supply the hydraulic pressure from a pump (not shown) for operating the bale ejectors 226.

The strapping apparatus 120, is adjusted by means of a control 236 having a dial 238 which again is a part of the steel strapping apparatus not per se a part of the present invention.

It is significant to note that whenever the strap 128 leaves one guide chute, such as chute 38 in follower block 26, and enters another, coacting chute, such as 103 in back wall 68, and there is a gap 39 therebetween, the leaving end of the chute is offset inward from the receiving end of the next coacting chute and the leaving or exit end of the chute is smaller than the entrance or receiving end of the next coacting chute. This permits some misalignment between movable parts of the press (for example, the follower block 26 and wall 66) without rendering the strap feeding inoperative. Thus, the chutes being tapered from the wide entrance to the narrow exit with some gap permitted between entrances and exits thereby eliminate the need for transition parts or perfect alignment or interlocking members between coacting chutes around bailing box 20.

The cycle of strapping can start, for purpose of explanation, with the ejection of one bale as shown in FIG. 24 and subsequently the electrical operation as described hereinafter to close the door 66 and to bring a new, partly prepared tramped bale into position under baling box 20. Prior to closing the door 66, the operator inserts the bottom 250 of a cardboard carton shown in FIGS. 11 and 14 and other places, onto the platform 40 and then places the larger and longer and deeper top 260 of the carton that subsequently and ultimately will be closed by the bottom 250 after the bale is partly tramped therein, into the baling box 20 by clamping it with the clamp portions 156 of the spring clamp device 155 which is actuated manually by knob 162 to retract the shaft 160 against the strong spring 158. Therefore, the baling box 20 is loaded with the larger, open-bottom top of the pasteboard or cardboard or other material carton and the bottom 250 of the carton is on the follower block assembly 26 to be partly filled and tramped with another bale 228 which ultimately will be inserted in the carton top 260 by the following procedure. The sides of the inside of the baling box 20 comprise a series of spaced plates telescopically arranged for gradual alignment, in this manner: a plurality of large plates 264 and each has a smaller inside plate 266 against which the lower edge of the box 260 are placed to rest on the upper edge 268 thereof. An intermediate plate structure comprising plates 270 are welded or otherwise fastened by means of membelts 272 onto the floor or platform 17 in a location between the baling box 20 and the movable ram follower block assembly 26 thereby to make a smooth transition of the box bottom 250 and the partly tramped bale 228 therein into the box top 260 to slide smoothly therein. It will be noticed in FIG. 14 that the plates 270 which form a sort of rim around the intermediate and transition space around four walls of box 20 between the moving platform 40 and the floor 17 are staggered or placed outwardly from the plates 266 to cause the edges of the box 250 to ride smoothly across the inner surface of plate 266 which being thicker than the box carton thickness at 260 will cause the carton bottom 250 to slide smoothly into the interior of the carton top 260 as shown by dotted lines in FIG. 13. As additional assurance in this, the walls 276 of lower box 16 are inward of the plate 270 causing a gap or space at 282 between the plate 270 and the carton bottom edge 250. Therefore, as the follower block assembly 26 is driven upwardly by the ram assembly 24 the carton bottom 250 necessarily must remain at all times inside of the surface of the carton top 260 so that there is no interference in inserting the carton bottom with the tramped fibers therein into the carton top for strapping to produce a finished bale 228 as shown in FIG. 24.

ELECTRICAL AND SEQUENTIAL

As in the aforementioned Merkel patent the above-described mechanical components may be operated automatically in sequence, with suitable safety provisions, and as will appear hereinafter the electrical components may be operated manually in sequence or to interrupt the sequence and at times the operation is manual. The specification now proceeds into the electrical arrangement and operation, with reference to FIGS. 27–30, inclusive.

As used hereinafter:

PB—pushbutton
LS—limit switch
T—timer
SS—selection switch
CR—relay
Sol (A, B, etc.)—solenoids
CCR—meter relay
CCRA—relay contacts
T–A—time delay contacts

PHASE OF OPERATION FOR AUTOCYCLE (1) Supply current to control circuit.
(2) Provide hydraulic power
(3) Tramp fiber into press box
(4) Determine weight of fiber being tramped into box to start auto pressing cycle
(5) Stop tramper above press box
(6) Unlock press and pull out stabilizers
(7) Start rotator
(8) Stop rotator
(9) Put in stabilizers
(10) Restart tramper after press has rotated and is in locked position
(11) Start press ram 24 up
(12) Stop ram 24 at proper height
(13) Feed strap 128 around bale
(14) Measure strap 128 as it is fed
(15) Grip strap 128
(16) Takes up extra so all straps 128 are approximately the same tension
(17) Seals and cuts strap 128
(18) Counter records cycle
(19) Unlock end door 92
(20) Open side door 68
(21) Bale 228 is released by bale ejectors 226

Note: Remainder of operations are manual

(22) Bale 228 is unloaded by pushbutton
(23) Upper and lower cartons parts 250, 260 placed in press box by hand
(24) Side door 68 closed by pushbutton
(25) End door 92 locked by pushbutton or automatic
(26) Ram 24 lowered by pushbutton

SEQUENCE OF OPERATION

Current to circuit is thru 15 amp. circuit breaker to power "OFF"-"ON" selector switch SS–1 (line 4) and emergency stop button PB–1 (line 4). Green light indicates power is on. Emergency stop button PB–1 (line 4) stops all operations of the press at any phase of the cycle. Interlock limit switch LS–1 (line 6) and LS–2 (line 9) are held closed by cam on end of press boxes when press is in locked position, completing the circuit. Selector switch SS–2 (line 6) offers choice of automatic or semi-automatic operation. With SS–2 on "automatic" strapping pump is started with pushbutton PB–25 (line 93). Press pump motor started with pushbutton PB–27 (line 99)—tramper pump motor started with pushbutton PB–29 (line 102). As tramper pump motor is started, relay CR10 (line 103) and meter relay CCR (line 104) are energized. Contacts CCRA (line 6) open—contacts CR10C (line 101) and CR10B (line 103) close forming holding circuit for tramper pump motor starter. Contacts CR10A (line 10) close providing current to tramper control circuit. Timed contacts CR10D (line 6) close after a time delay. These contacts prevent a false cycle thru contacts CCRA (line 6), by the initial surge of current required in starting tramper pump motor. After surge is over contacts CR10D (line 6) close. Position tramper "OFF"-"ON" selector switch SS–3 (line 10) to "ON" position. Current passes thru limit switch LS–15 (line 12) and LS–16 (line 12) with charge hopper doors closed. (The tramper will stop at any position if either of the charge hopper doors are opened.) Current continues thru normally closed contacts of limit switch LS–3B (line 14) and normally closed contacts CR2C (line 14) energizing "up" solenoid "C" (line 13), timer T2 (line 14) and "vent" solenoid "D" (line 15) thru time delay opening contacts T2A (line 15). Tramper cylinder is now being vented. As contacts T2A (line 15) open, tramper moves up. As tramper moves up, limit switch LS–5 (line 16) is closed by cam on tramper control rod, energizing solenoid "E" which extend the pusher. As tramper reaches the top of its stroke, the normally open contacts of limit switch LS–3B (line 11) are closed by cam on tramper control rod energizing timer T1 (line 11) and "vent" solenoid "B" (line 12). Tramper is vented and stops at the top of its stroke. Time contacts T1A (line 12) open after time delay, stopping vent. After pusher is fully extended, limit switch LS–17 (line 8) is closed by cam (line 9) and CR2B (line 10). Down solenoid "A" (line 10) is energized thru contacts CR2B. Contacts CR2C (line 14) open. Tramper now moves down. As tramper moves down, limit switch LS–6 (line 17) is closed by cam on tramper control rod energizing solenoid "F" (line 17), retracting the pusher as tramper reaches the bottom of its stroke limit switch LS–34 (line 8) is opened by cam on tramper control rod de-energizing relay CR2 (line 8). Contacts CR2A (line 10) open de-energizing solenoid "A" (line 10). Contact CR2C (line 14) close energizing solenoid "C" (line 13) and tramper moves up.

When approximately 500 pounds of fiber has been tramped into the press-box, meter relay CCR (line 104) is energized by the load on the tramper pump motor. Contacts CCRA (line 6), which was opened as tramper pump motor was started, closes sounding signal horn (line 6) and energizing relay CR1 (line 7). Contacts CR1A (line 8), CR1C (line 13) and CR1D (line 14) close. Contacts CR1B (line 9) opens so that current to tramper circuit is supplied only thru normally close contacts of limit switch LS–4 (line 10), tramper continues down and reverses to come up. As tramper follower block reaches the top of the press box, the normally closed contacts of limit switch LS–4 (line 10) are opened by cam on tramper control rod, shutting off power to tramper circuit. The normally open contacts of limit switch LS–4 (line 13) close energizing timer T1 (line 11) and vent solenoid "B" (line 12). Tramper is vented and stops at the top of the press box. Press is now ready to rotate.

With ram down holding LS–11 (line 25) closed, relay CR4 (line 26) is energized and contacts CR4A (line 18) are closed. Current is then supplied to press unlock solenoid "G" (line 18) and stabilizers out solenoid "H" (line 19) thru LS–4 (line 13), CR1C (line 13), CR1D (line 14) and CR4A (line 18). Limit switch LS–7 (line 18) is closed, by press locking pawl as the press is unlocked, and limit switch LS–8 (line 19) is closed, as the stabilizers move out, thereby supplying current to press rotator motor. As press rotates, limit switch LS–9 (line 19) is momentarily opened; by cam on rotator sprocket, de-energizing motor starter contacts MF (line 19) which stops rotator motor at the proper position for the press to coast into the locked position. As press comes to lock position, limit switch LS–10 (line 21) is momentarily made, energizing relay CR3 (line 24), closing contacts CR3A (line 23) and CR3B (line 30). Relay CR5 (line 30) is then energized thru contacts CR3B (line 30) closing contacts CR5A (line 17) which energizes stabilizers in solenoid "U." With stabilizers in, limit switch LS–13 (line 26) is closed energizing relay CR6 (line 27), closing contact CR6B (line 32). Limit switch LS–1 (line 6) and LS–2 (line 9) are again held closed after press is locked and tramper begins tramping on a new bale. Fiber is now over the ram and is ready to be pressed out. The foregoing is Merkel 3,252,409.

With ram 24 control selector switch SS–4 (line 35) "ON" current is supplied to ram Up solenoid "K" (line 32) and ram moves up. When follower block 26 is 30" from platen 102 on upper beam 78, the normally closed contacts of limit switch LS–18 (line 35) opens stopping the ram 24 up. Pressure switch PS–1 (line 29) is a safety switch, set at approx. 2400 p.s.i., to prevent too much pressure from being put on the ram 24 due to an oversized bale 228. The normally open contacts of limit switch LS–18 (line 41) close. With end locking door 92 closed, current is supplied thru normally closed contacts of step switch STX (line 77) to the coil of step switch ST (line 77) which energizes rotary solenoid, cocking step switch. As coil ST (line 77) is energized, contacts STX (line 77) in switch position #1 open, de-energizing coil ST (line 77) and advancing step switch to position #2, feed. Solenoid "V" (line 69) and CTR (line 70) are energized thru N.C. contact ST1 (line 69) to feed straps around bale and measure to proper length. Solenoid "Z" (line 75) is energized thru N.C. contacts ST6 (line 75) to run strapping pump on high pressure. Coil ST (line 77) is energized thru N.C. contacts ST1 (line 69) and ST9 (line 83) and STX (line 77) to cock step switch. Solenoid "V" (line 69) and CRT (line 70) are held thru contacts CRTA (line 70). ST is de-energized by contacts STX (line 77) to advance step switch to position #3, set feed. Coil ST (line 77) is energized and held thru contacts ST10 (line 84) to cock step switch. After CTR (line 70) measures correct length of strap, contacts CTRA (line 70( open. After CTRA are opened, solenoid "V" (line 69), CTR (line 70), and coil ST (line 77) are de-energized. This stops the feed of strapping, stops measurement and advances step switch to position #4, Grip. Solenoid "W" (line 72) is energized thru contacts ST3 (line 72) to grip strap ends. Timer TR5 (line 85) is energized thru contacts ST11 (line 11) to time delay to grip ends. After 1 second, timer TR5 (line 85) times out and contacts TR5A (line 86) close-coil ST (line 77) is energized thru contacts TR5A to cock step switch. Coil ST is de-energized by STX (line 77) to advance step switch to position #5, take up. Solenoid "X" (line 73) is energized thru contacts ST4 (line 73) to take up straps around bale and pull tight. Timer TR5 (line 85) is de-energized by contacts ST11 (line 85) to reset. Timer TR6 (line 87) is energized thru contacts ST12 (line 87) to time delay to pull straps tight. After approximately 2 seconds, timer TR6 (line 87) times out. Coil ST (line 77) is energized thru contacts TRGA (line 88) to cock step switch. ST is de-energized by contacts STX (line 77) to advance step switch to position #6, Seal. Solenoid "X" (line 73) is de-energized by contacts ST4 (line 73) to stop pulling straps. Solenoid "y" (line 74) is energized thru contacts ST5 (line 74) to seal straps. Timer TR6 (line 87) is de-energized by contacts ST12 (line 87) to reset. Timer TR7 (line 89) is energized thru contacts ST13 (line 89) to time delay to seal straps. After 2 seconds, timer TR7 (line 89) times out. Coil ST (line 77) is energized thru contacts TR7A (line 90) to cock step switch. Coil ST (line 77) is de-energized by contacts STX to advance step switch to position #7, Return. Solenoid "W" (line 72) is de-energized by contacts ST3 (line 73) to allow return from grip. Solenoid "y" is de-energized by contact ST5 (line 74) to allow return of seal. Relay CR14 (line 81) is energized thru contacts ST8 (line 81) to set up strapping complete circuit. Timer TR5 (line 85) is energized thru contacts ST11 (line 85) to time delay for return. After 1 second, TR5 times out. Coil ST (line 77) is energized thru contacts TR5A (line 86) to cock step switch. ST is de-energized by contacts STX (line 77) to advance step switch to position #8, Step. Coil ST (line 77) is energized thru contacts STX (line 77) to cock step switch. ST is de-energized by contacts STX (line 77) to advance step switch to position #9, Reset. Solenoid "Z" is de-energized by contacts ST6 (line 75) to idle pump on low pressure. Timer TR5 (line 85) is de-energized by contacts ST11 (line 85) to reset. Pushbutton PB–23 (line 76), cycle reset, light is energized thru contacts ST14 (line 91) to indicate step switch is reset.

Current is supplied thru contacts ST7 (line 79) and contacts CR14B (line 80) which energizes solenoid "N" (line 44), unlocking end press door 92. Limit switch LS–23 (line 48) is made, as end door 92 is unlocked, energizing relay CR13 (line 48). Contacts CR13A (line 49) and CR13B (line 49) close forming holding circuit CR13 and supplying current to solenoid "R" (line 52), opening the side door. Limit switch LS–21 (line 49) is opened, as side door 68 is opened, dropping out relay CR13 and stopping, side door 68 open. As side door 68 is opened, limit switch LS–24 (line 59) is closed energizing relay CR11 (line 59), closing contacts CR11A (line 60) and CR11B (line 60) supplying current to timer T3 (line 34) and solenoid "M" (line 36), ram down. Ram 24 is vented thru contacts T3A (line 33). After T3A opens, ram 24 moves down approx. 8" and limit switch LS–22 (line 60) is opened by cam 54, 56 on press ram control rod 50, de-energizing solenoid "M" (line 36) stopping ram 24 and releasing bale 228. Pushbutton PS–21 (line 62) energizes timer T4 (line 62) closing contacts TR4A (line 63) and activates solenoid "U" (line 64) which extends unloading rams to unload bale 228 from press. After timed delay solenoid "U" is deactivated by TR4A and unload rams retrace. Lower carton 250 is placed on follower block and ram 24 lowered by pushbutton PB–11 (line 35) which energizes ram down. Solenoid "M" (line 36) directly. Upper carton 260 is then placed between stationary side door 66 and spring loaded upper carton retainer 155 on platen 102 of upper beam. Side door 68 is closed by pushbutton PB–19 (line 57). End locking door 92 closed by pushbutton PB–16 (line 45). Press is now ready to begin another complete cycle.

SWITCHES

The following switches are Merkel et al. 3,252,409, until noted:

Limit Switch LS–1.—Mounted in switch actuator unit on press lock post-tripped and held closed by cam on press box ends. Interlocks tramper.

Limit Switch LS–2.—Mounted in switch actuator unit on press lock post. Tripped and held closed by cam on press box ends. Interlocks tramper and press ram 92.

Limit Switch LS–3A.—Mounted on upper beam, tripped by cam on tramper control rod, stops tramper down.

Limit Switch LS–3B.—Mounted on upper beam, tripped by cam on tramper control rod, stops tramper up.

Limit Switch LS–4.—Mounted on upper beam, tripped by cam on tramper control rod, stops tramper above press box and interlocks rotator.

Limit Switch LS–5.—Mounted on upper beam, tripped by cam on tramper control rod, extends pusher.

Limit Switch LS–6.—Mounted on upper beam, tripped by cam on tramper control rod, retracts pusher.

Limit Switch LS–7.—Mounted on press lock post, tripped by press lock pawl, in unlock position, starts rotator.

Limit Switch LS–8.—Mounted on stabilizer support. With stabilizers out, tripped closed by cam on stabilizer shaft, interlocks rotator.

Limit Switch LS–9.—Mounted on lower beam, tripped by cam on rotator sprocket, stops rotator.

The above switches are Merkel et al. 3,252,409.

Limit Switch LS–10.—Mounted in switch actuator unit on press 20 lock post. Tripped by cam on box ends 90, 92. Completes ram 24 circuit.

Limit Switch LS–11.—Mounted near press ram 24, tripped by one cam 54, 56 on ram control rod. Indicates ram down & interlocks rotator.

Limit Switch LS–13.—Mounted on stabilizer support (Merkel 3,252,409) with stabilizers in, tripped closed by cam on stabilizer shaft (Merkel 3,252,409). Interlocks tramper & press 20 ram.

Limit Switch LS–15.—Mounted on charge hopper ends. Tripped by door, interlocks tramper. (Merkel 3,252,-409)

Limit Switch LS–16—Mounted on charge hopper ends. Tripped by door, interlocks tramper. (Merkel 3,352,-409)

Limit Switch LS–17.—Mounted inside accra flow lint charger. Tripped by cam on pusher. Completes tramper down circuit. (Merkel 3,252,409)

Limit Switch LS–18.—Mounted on lower beam near ram. Tripped by cam 60 on ram control rod. Stops ram 54 with follower block 30" from battens on upper beam 102. Starts tying heads 120.

Limit Switch LS–19.—Mounted on inside door 68 support, tripped by cam when side door 68 closes. Locks press doors 68, 92, etc.

Limit Switch LS–20.—Mounted on press strain channel, tripped by cam on end lock door 92, prevents tying with doors open.

Limited Switch LS–21.—Mounted on inside door 68 support, tripped by cam when side door 68 opens. Stops side door 68 open.

Limited Switch LS–22.—Mounted on lower beam 10 near ram 24, tripped by cam 58, 60 on ram control rod 24. Stops ram 24 after bale 228 is released.

Limit Switch LS–23.—Mounted on press 24 strain channel, tripped by cam on end lock door 92, opens side door 68.

Limit Switch LS–24.—Mounted on inside door 68 support, tripped by cam when side door 68 opens. Releases bale 228.

Limit Switch LS–25.—Mounted on lower beam 10 near ram 24, tripped by cam on ram control rod. Vents ram 24 to reduce hyd. shock.

Pressure Switch PS–1.—Mounted on press pumping unit (not shown), opens on rising pressure, stops ram up.

Current relay CCR.—Activated by rising load on tramper pump motor (not shown). Starts press cycle.

LIMIT SWITCH (LS) OPERATION (I) Reference is again made to the aforementioned Merkel Patent 3,252,409 and the electrical diagram therein which is reviewed in conjunction with the present electrical operation of the automatic strapping.

(II) Limit Switches are referred to by symbols LS on the enclosed electrical diagrams, FIGS. 25 thru 28, inclusive, wherein on the left hand side there is a legend "L" followed by a number (for example L1; L2; L3;) referring to a line or wire or circuit portion of the overall control circuit, whereby reference to L21 enables one to find this wire or this circuit immediately and to identify it with other electrical circuits and parts.

(III) Certain Limit Switches are shown on the various figures of the drawings and identified therein by their proper legend. The following, until otherwise noted, is Merkel et al. 3,252,409 and is not per se shown or described herein:

(a) Limit Switches LS3B, LS3A at lines 21 and 22 on contacts B, position that plate in notch A with the tramper up; LS3B at lines 21 and 72 on contacts B and lines 21 and 98 on contacts A, positioning the plate in notch B to stop the tramper plate in the up position.

(b) LS5 at lines 21 and 17 on contacts A to position the plate in notch B and extend the pusher.

(c) LS6 at lines 21 and 18 on contacts A, positioning the plate in notch B to retract the pusher.

(d) LS4 at lines 4 and 25 on contacts A and wires 8 and 10 on contacts B, positioning the plate in notch B operating on the up stroke to stop the tramper above the top of the box and to interlock the rotator.

(e) LS1 is wired normally open and is found in lines 4 and 5 and is held closed by the cam on the press box ends.

(f) LS2 is wired normally open and is found at lines 4 and 8 and is held closed by the cam on the press box ends.

(g) LS7 is wired normally open and is found at lines 28 and 32 and is closed by the locking pawl in the unlocked position.

(h) LS9 is wired normally closed and is found at lines 32 and 33; open momentarily by the cam on the sprocket (not shown herein but found in the Merkel patent) as the press rotates to stop the rotor motor at the proper position for the press to coast into locked position.

(i) LS10 is wired normally open and is found at lines 4 and 34 and is closed momentarily by the cam on the press box ends.

(j) LS13 is wired normally open and is found at lines 8 and 70 and is adjusted by the cam on the shaft to close the switch when the stabilizers are in.

(k) LS8 is wired normally open and is found at line 71 and 29 and is adjusted by a cam on the shaft to close switches when the stabilizers are out.

(l) LS17 is wired normally open and is found at line 22 and 24; closed by cam on pusher when fully extended (interlocks the tramper down circuit).

(m) LS16 is wired normally open and is found at lines 19 and 21 and is closed by the door on the front of the charger hopper.

(n) LS15 is wired normally open; found at lines 16 and 19 and is closed by the door on the front of the charger hopper.

The above is Merkel et al. 3,252,409.

(o) LS24 is wired normally open; found at lines 76 and 85; momentarily closed by the cam on the side door 68 clevis.

(p) LS19 is found at lines 58 and 94; on normally open contacts at lines 84 and 88; on normally closed contacts, locks in door 68.

(q) LS21 is wired normally closed; lines 82 and 83 and is opened by the cam on the side door 68 and stops the side door 68 in open position.

(r) LS11 is found at lines 4 and 69 on contacts A; positioning plate in notch B (Merkel 3,252,409); stops the ram 24 in down position.

(s) LS22 is found at lines 47 and 90 on contacts A; positioning the plate in notch A and stops the ram 24 after moving down approxiamtely 6 inches, thereafter releasing the bale.

(t) LS11, LS25, LS18, LS22 are actuated by adjustable cams 54, 56, 58, 60 on the control rod 50. LS11 stops the ram 24 in down position approximately ¼ of an inch before hitting the bottom of the cylinder; LS25 is adjusted to momentarily open the switch just before the follower block assembly 26 reaches the dog release lever. LS22 is adjusted to stop the ram 24 in down position after the ram 24 has moved approximately 6 inches from being stopped by LS18 or 36 inches from the battens to the top of the follower block assembly 26. LS18 is adjusted to stop the ram 24 up with the top of the follower block platform 40 approximately 30 inches from the bottom of the battens on the upper beam.

It should be noted again that portions of the circuit may be eliminated and may be operated manually. If it is desired, it is possible to eliminate the fixed-box rotation of boxes 16 and other movable boxes and to feed the baling press, baling box 20 in an automatic or semi-automatic or strictly manual method so long as a partly prepared mass is inserted into the baling box 20 at which time the above noted circuits relating to that operation only may be actuated manually or semi-automatically or automatically and may be stopped at any time. The above noted operation, schematic and electrical diagram is only form of an automatic operation which may be used in conjunction with one form of a fixed-box, rotatable press arrangement as shown in the Merkel Patent 3,252,409 which is not indispensable to the present invention, but which, as mentioned before, provides an excellent basis for the instant method and for apparatus to be combined with tramping in one box in one location and final compression and strapping in the other location and box including, if desired, automatic and simultaneous operation.

MODIFICATION—FIGS. 31–45

As mentioned in the introduction, the previously described baling box 20 is arranged to be used in the method of applying tying members around the girth of a bale transversely or laterally in the case of the usual bale which is a three-dimensional bale having a longitudinal axis and a transverse axis thereby providing a reference as to whether a tying member or steel strap is applied around the lateral or transverse girth or around the longitudinal girth. Although it is unusual, if a bale were perfectly square then one axis would be designated longitudinal and the other lateral or transverse in order to differentiate the two. At times it may be desirable to apply a longitudinal girth tying member or steel strap member to a bale and while this could be done in a separate operation after tying the transverse or lateral girth members on the bale the present invention provides apparatus in the form of a modification to the baling box 20 to provide simultaneously with the transverse girth tying members at least one longitudinal girth tying member which for present reference travels around the bale longitudinally around the ends, the top and the bottom in the present arrangement where there is a platen on the top and a ram assembly applicable to the bottom.

By way of summation, what this involves is to provide guide means or guide chutes supplied by a tying member supply and tensioning and connecting means such as one of the machines described and designated as a strapping device 120 in the previous embodiment and directing the steel strap through a guide means or chute in one end, thence around the inside of the top or platen, thence around the other end and then through the follower block assembly back substantially adjacent to the point of origin and bringing the continuous strapping member back upon itself to be connected. Since the operation is performed simultaneously with the transverse girth strapping member delivery, it is necessary that provision be made for the intersections so that there will be no conflict between the longitudinal strapping member and the various transverse strapping members.

Referring to the drawings, the modified box is designated generally by reference numeral 400 and is arranged substantially the same as the baling box 20 in the previous embodiment having the same ram assembly 24, follower block assembly 26, end walls 88 and 92, which have been modified as will appear hereinafter, a platen 102 which has been modified, a strapping device 120, the steel strap 128 which in FIG. 31 and other figures is shown as a series of straight and dashed lines with arrow-heads indicating the path of the strap and other lines with arrowheads 402 indicating merely the direction of the strap but not the path thereof.

The previous platform number 40 has been modified and is numbered 403 and includes divided guide chutes 36' similar to guide chutes 36 and in addition a longitudinal guide chute designated generally by reference numeral 404 which comprises opposed walls 406 and a bottom plate 408. The opposed walls 406 are flared at the entrance 407 as compared to the exit 409. Wherever an intersection takes place between a transverse strapping member and a longitudinal strapping member, the exit end 304a of the guide chutes 36' are smaller than the entrance end 202a to facilitate the entry of the strapping member at the cross over points. A portion 406a of wall 406 is tapered inwardly towards the center of the guide chute 36' as shown in FIG. 36. This insures the release of the strap outwardly through the slot when the strap is tensioned. This is repeated on the outside walls.

Figure 31:
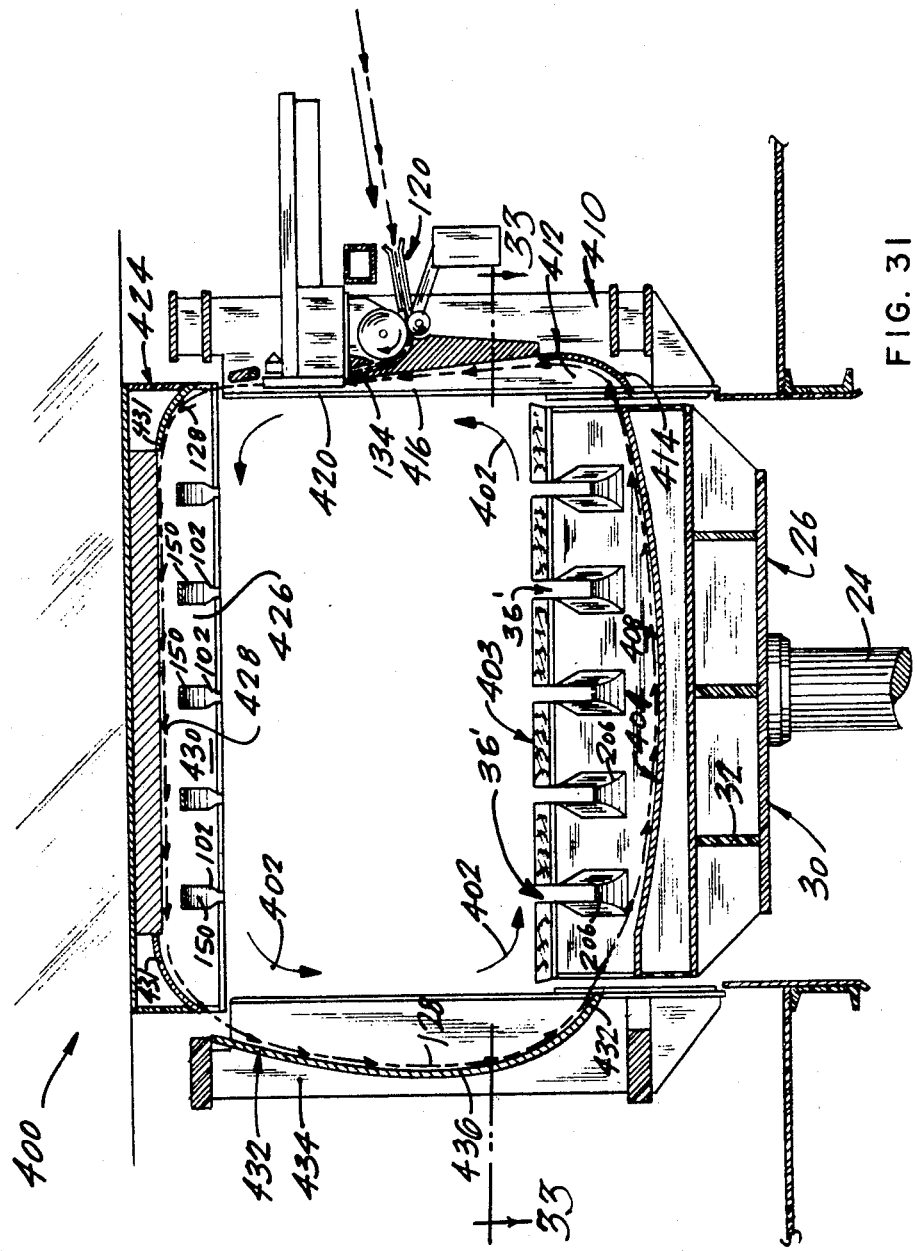
FIG. 31 is a longitudinal cross-section view of a modification to the baling box to include a longitudinal girth band.
Figure 32:
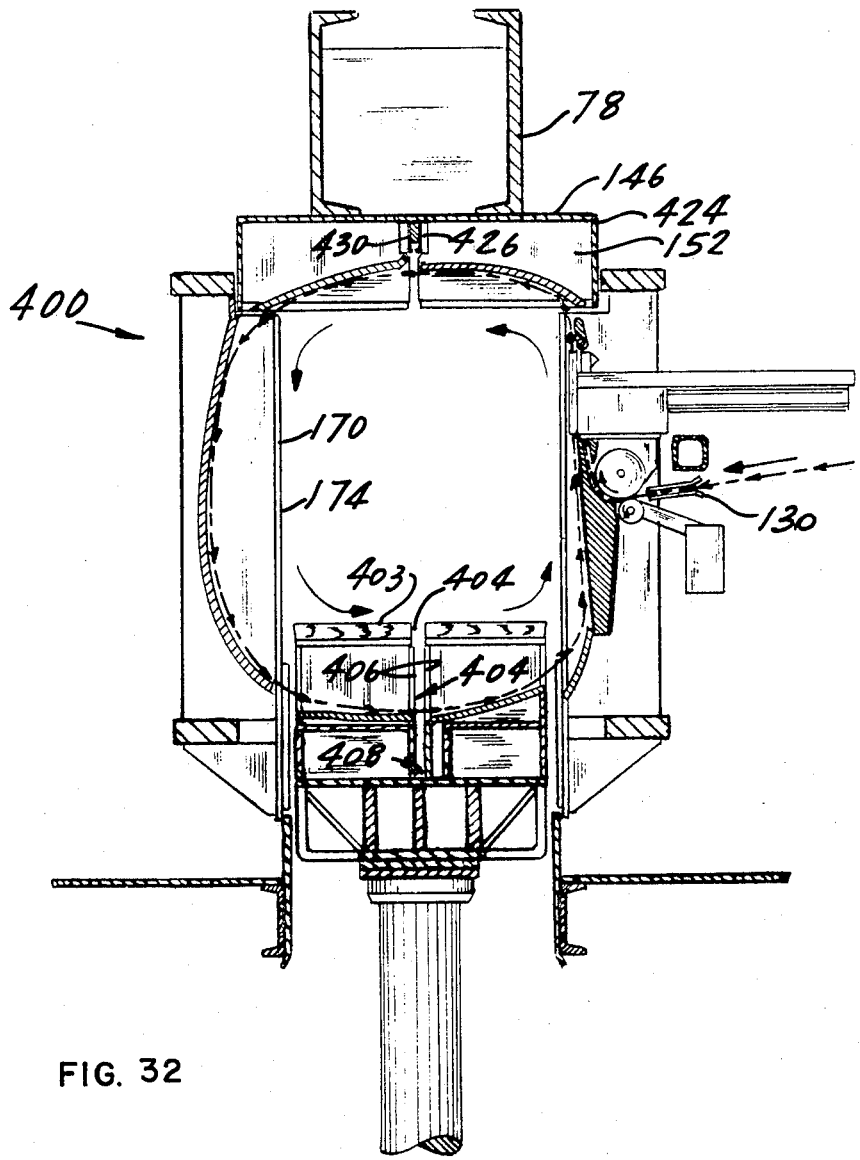
FIG. 32 is a vertical transverse cross-sectional view of the modified baling box shown in FIG. 31.

As will appear readily in FIG. 31 and other places, the elevation of the bottom plate 408 is different from and in this particular embodiment lower than the elevation of the bottom of the guide chutes 36' which assist in preventing conflict between the strapping members until the respective members have completed the encirclement. Due to this relationship of the guide chutes, the longitudinal strap goes on the bale outside of the transverse straps.

The strapping device 120 for the longitudinal strap is located on the modified end door designated 410 generally and which as mentioned previously is essentially the same as the corresponding door in the previous embodiment except for the provision for the longitudinal strap. The door 410 is provided with a chute 412 comprising a plate 414 and also sides 416. The strapping member 128 is directed through a closed channel 420 which is where the end of the strapping member 128 is brought back upon itself and tied in accordance with the operation of the strapping device 120. The top platen is designated by reference numeral 424 and also as mentioned previously is essentially the same as the previous embodiment except that a longitudinal guide chute designated generally by reference numeral 426 is provided having a guide surface 428 and side walls 430. The ends of the guide wall 428 are provided with curved plates 431 to direct the strapping member 128 to enter a guide chute or guide means 432 on the modified end 434 which is the same as in the previous embodiment except for the provision of the longitudinal guide means 432.

Guide means 432 comprises a curved or arcuate plate 436 having the upper end offset outwardly from the plate 430 of the top guide 426 to receive the strapping member 430 and having the bottom offset inwardly at 432 leading to the bottom guide plate means 404 to assist the strapping member in making a smooth entry.

As seen in FIG. 37, and other figures of the drawings, the plates 430 of the longitudinal guide 426 may be displaceable and spring mounted on the guide 426 by means of coil springs 434 on each side held in place by a retainer 436 which will allow the strapping member 128 to be pulled from the confined closure between the walls 430 when the tension is applied to bring the strapping member 128 into place around the bale. This is a well known construction in this art and does not per se form any part of this invention.

The walls 406 at each of the guide chutes 36' are slanted or tapered on each side at 406a like that shown by both solid and dotted lines in FIG. 40, to assist the strap 128 in leaving the chutes 36' and to reduce the chances of hanging on the edge of the chute 36' or on the edge of the platform 403. The walls 406 are substantially perpendicular to the surface of follow block surface 403. The same arrangement may be employed wherever wanted at each chute leading from the bottom plate 408 in chute 404 as well as any other chute in the embodiment of FIGS. 31–45 as well as the previous embodiment, as desired, and wherever the problem of the hanging of the strap 128 on an edge might occur. The shape and detail of the tapered part 406a is seen in FIGS. 36, 40 and in the divided chutes 36' in the FIG. 35 embodiment this taper is found looking into the chutes 36' from the longitudinal guide chute 404. The tapered parts 406a may be formed in the plates 406 as contrasted with separate plates like 216.

STRAP 128 RELEASE

Figure 46:
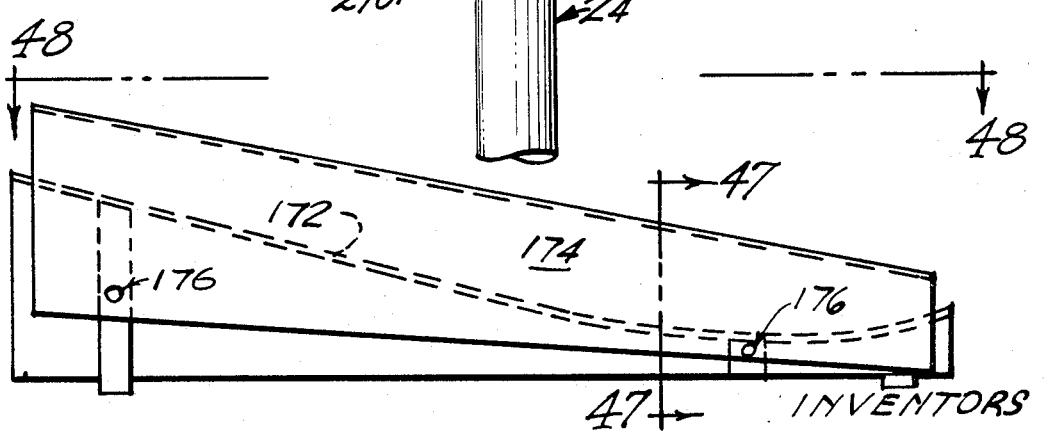
FIG. 46 is a side elevation view of a strap releasing guide means.
Figure 6:
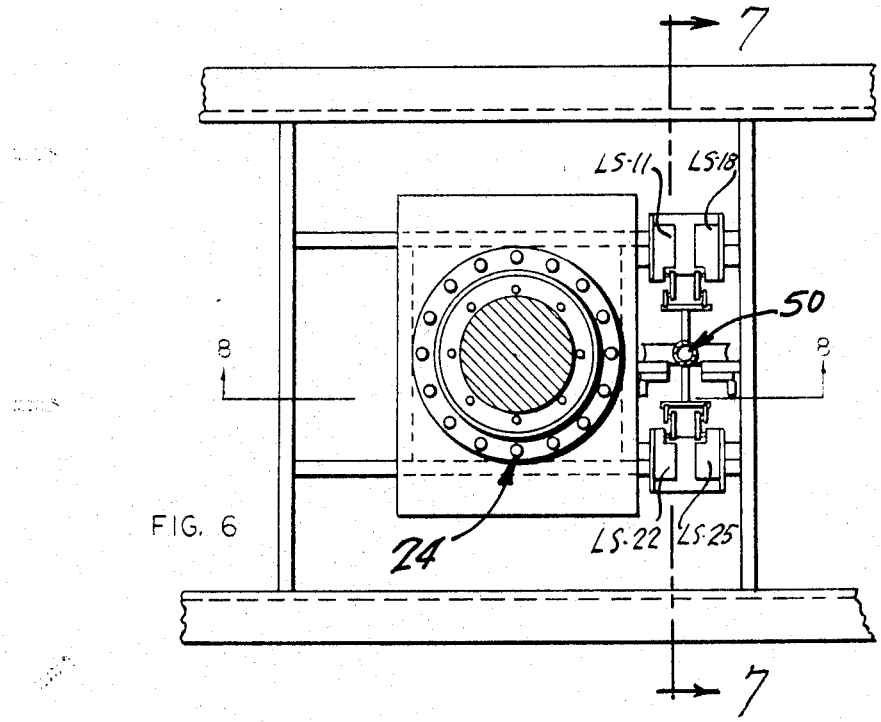
FIG. 6 is an enlarged cross-sectional view taken substantially along lines 6—6 in FIG. 2.
Figure 8:
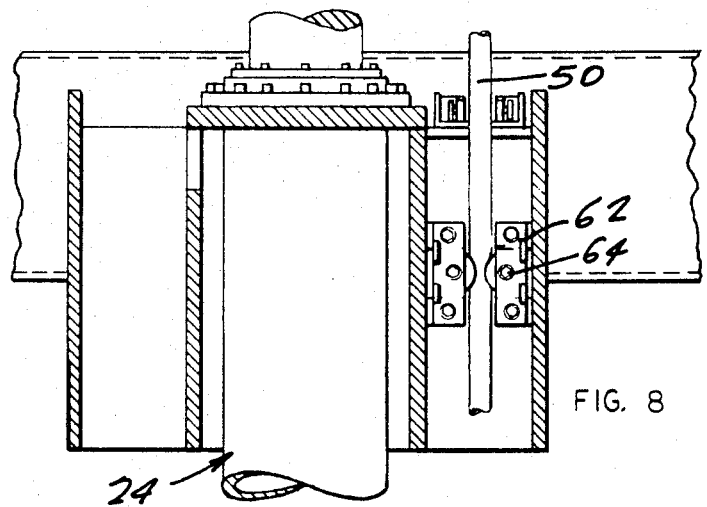
FIG. 8 is an enlarged cross-sectional view taken substantially along lines 8—8 in FIG. 6.

FIGS. 46, 47 and 48 illustrate in larger detail the means in guide means 106, as well as other guide chutes where this arrangement may be beneficial, for retaining and guiding strap 128 as well as releasing same positively and with reduced chance of the strap hanging on an edge similar to the use of the tapered portions 406a in FIG. 36 et al. but comprising instead the web plates 174 each of which has a slanted or tapered edge 174′ and which at each end of the channel 170 defines a converging cam surface against which the strap 128 rides at each end when the strap 128 is pulled or tensioned to leave the respective chutes 106 etc. The strap 128 cams open the plates 174 against spring arrangement 176 thereby releasing the strap and guiding same upon release to clear the sides 174 and any other obstructions.

While we have shown and described a particular embodiment of this invention together with a suggested mode of operation and while we have disclosed a method which may make use of the present apparatus, as well as a modified form of the apparatus, this is by way of illustration only and does not constitute any sort of limitation on the scope of our invention since various alterations, changes, deviations, eliminations, substitutions, additions, departures, omissions and additions may be made in the present disclosure without departing from the scope of our invention as interpreted by the appended claims.

What is claimed:

1. A baling press for baling flowable fibrous material, such as cotton and synthetic fibers, to form a banded bale, comprising a baling box having substantially planiform walls defining a substantially rectangular baling chamber including first walls defining five sides of the chamber restrained at selected stationary positions during compression of fibrous material in said chamber and a second wall movable through a compressing stroke from a retracted position spaced externally from said chamber to a compression position closing the baling chamber and defining the sixth side thereof, means for transferring a charge of fibrous material into said baling chamber, means for forcing said second wall from said retracted position to said compression position against the material in said chamber to compress the material into a bale of selected bale density having six substantially planar faces by compression pressure exerted by said walls on said six faces, four of said walls paralleling a selected axis of the chamber having guide track grooves therein opening inwardly of the chamber collectively defining a plurality of substantially continuous strapping guide tracks circumscribing the chamber in parallel planes perpendicular to said axis to respectively guide banding straps in closed loop paths around the bale, and one of said four walls having automatic strap feeding means located thereon externally of the chamber and communicating with the guide track grooves of said one wall for feeding banding straps through said guide tracks to form closed loop bands thereof about the bale and tighten and secure the bands while said second wall is in said compression position subjecting the bale in said chamber to full compression pressure on all six faces thereof.

2. A baling press as defined in claim 1, wherein four of said walls include additional guide track grooves collectively defining a second substantially continuous strapping guide track circumscribing the chamber in a plane parallel to said selected axis of the chamber to guide a banding strap in a closed loop path around the bale, and means for automatically feeding a banding strap through said second guide track to form a closed loop band thereof about the bale and tighten and secure the same concurrently with said feeding, tightening and securing of said first-mentioned banding straps.

3. A baling press as defined in claim 1, wherein one of said first walls is a normally stationary wall in parallel confronting relation to said second wall, the remaining ones of said first walls forming two pairs of first walls disposed in opposite parallel confronting relation to each other, the walls of one of said pairs being supported for relative approaching and withdrawing movement between a first position defining compression walls constraining the confronting faces of the fibrous material in said chamber during compressing movement of said second wall and a second position releasing said confronting faces, and the first walls of said second pair being respectively a normally stationary wall and a hinged movable wall defining a door openable to provide an opening for discharge of the banded bale from said chamber, and said automtic strap feeding means being located on one of said normally stationary walls to feed banding straps of indeterminate length into said guide tracks from a stationary strap supply zone.

4. A baling press as defined in claim 1, wherein one of said first walls is in confronting parallel relation to said second wall along a selected axis perpendicular to said walls, said baling press including charging box means having a first position spaced laterally of said selected axis for collecting and shaping fibers fed thereto along a filling axis paralleling said selected axis into a substantially rectangular mass of fibers of cross-sectional size to be insertable into said chamber, said charging box having walls defining a rectangular tubular surround, means for transferring said charging box means into alignment with said chamber along said selected axis with the walls thereof lying substantially in the extended plane of four of said first walls and the fibrous material therein located between said chamber and said second wall when the latter occupies said retracted position, and means for advancing said second wall through said compressing stroke in engagement with the mass in said charging box means to advance the mass into said chamber and compress the same.

5. A baling press as defined in claim 1, including means in said chamber for releasably supporting a first partial box section within said chamber against said first walls and opening toward said second wall, means for preshaping the fibrous material into a rectangular mass sized for insertion into said chamber, and means for supporting a telescopically mating second partial box section in partially enclosing relation to an end portion of the preshaped mass located opposite said chamber in alignment with said first box section along a telescoping axis between said chamber and said second wall when the latter is in retracted position, said second wall engaging said second box section and advancing the same with said preshaped mass into said first box section to form a completely enclosing box, and said closed loop bands being formed about and tightened and secured around said mated box sections.

6. A baling press as defined in claim 1, wherein said first walls define a downwardly opening chamber and said second wall comprises a follower block movable along a vertical axis from said retracted position to said compression position, means in said chamber for releasably supporting a downwardly opening first partial box section therein having a top and sides disposed against said first walls, the press including a collecting station having a movable charging box spaced laterally from and below the level of said baling box for receiving and supporting in the lower zone thereof an upwardly opening second partial box section telescopically matable with said first box section and means for tramping the fibrous material into said charging box in partially enclosed relation to said second box section at said collecting station to form a rectangular mass of the fibers therein having a horizontal cross-section corresponding substantially to the horizontal cross-section of said chamber, said second wall at said retracted position being below the level of the mass in said charging box, said means for transferring said charging box to a position aligning the mass therein with said chamber for movement of the second wall through the charging box in engagement wtih said second box section to propel the latter into telescopically mated relation with said first box section to encase the mass within said box sections during said compressing stroke.

7. A baling press as defined in claim 1, wherein the chamber defined by said first walls is a downwardly opening chamber, said chamber including means for releasably supporting a downwardly opening first box section having a top wall and vertical side and end walls within said chamber with the walls of said box section against said first walls, said means for transferring said charge into said baling chamber including means for supporting a second upwardly opening box section telescopically matable with said first box section adjacent said second wall when the latter is at said retracted position with said charge of fibrous material located between the chamber and said second box section, said second box section and said charge being telescopically advanced into said first box section in the chamber by said second wall to form the box sections into a completely enclosing carton and compress the material into said bale during said compression stroke and said bands being formed about said carton.

8. A baling chamber as defined in claim 7, wherein said means for transferring said charge comprising a pair of charging boxes each having walls defining a rectangular tubular surround for shaping fibrous material into a substantially rectangular mass of a horizontal cross-section corresponding to said baling chamber and each having a movable bottom wall member forming said second wall of said baling chamber, each of said charging boxes being movable alternately between a collecting station spaced laterally from and below the level of said baling box and a charging position aligned vertically with said baling chamber, said second box section being disposed in said charging boxes against said bottom wall member at said collecting station to locate the second box section about the lower end portion of the mass formed in said charging boxes, and said means for forcing said second wall including reciprocative power means located below said charging position for engaging the bottom wall member of the charging box occupying said charging position and forcing the bottom wall member together with the second box section and mass supported thereon through the charging box and into the baling chamber.

9. A baling press as defined in claim 2, wherein the chamber defined by said first walls in a downwardly opening chamber, said chamber including means for releasably supporting a downwardly opening first box section having a top wall and vertical side and end walls within said chamber with the walls of said box section against said first walls, said means for transferring said charge into said baling chamber including means for supporting a second upwardly opening box section telescopically matable with said first box section adjacent said second wall when the latter is at said retracted position with said charge of fibrous material located between the chamber and said second box section, said second box section and said charge being telescopically advanced into said first box section in the chamber by said second wall to form the box sections into a completely enclosing carton and compress the material into said bale during said compression stroke and said bands being formed about said carton.

10. A baling chamber as defined in claim 9, wherein said means for transferring said charge comprising a pair of charging boxes each having walls defining a rectangular tubular surround for shaping fibrous material into a substantially rectangular mass of a horizontal cross-section corresponding to said baling chamber and each having a movable bottom wall member forming said second wall of said baling chamber, each of said charging boxes being movable alternately between a collecting station spaced laterally from and below the level of said baling box and a charging position aligned vertically with said baling chamber, said second box section being disposed in said charging boxes against said bottom wall member at said collecting station to locate the second box section about the lower end portion of the mass formed in said charging boxes, and said means for forcing said second wall including reciprocative power means located below said charging position for engaging the bottom wall member of the charging box occupying said charging position and forcing the bottom wall member together with the second box section and mass supported thereon through the charging box and into the baling chamber.

11. A baling press as defined in claim 3, wherein the chamber defined by said first walls is a downwardly opening chamber, said chamber including means for releasably supporting a downwardly opening first box section having a top wall and vertical side and end walls within said chamber with the walls of said box section against said first walls, said means for transferring said charge into said baling chamber including means for supporting a second upwardly opening box section telescopically matable with said first box section adjacent said second wall when the latter is at said retracted position with said charge of fibrous material located between the chamber and said second box section, said second box section and said charge being telescopically advanced into said first box section in the chamber by said second wall to form the box sections into a completely enclosing carton and compress the material into said bale during said compression stroke and said bands being formed about said carton.

12. A baling chamber as defined in claim 11, wherein said means for transferring said charge comprising a pair of charging boxes each having walls defining a rectangular tubular surround for shaping fibrous material into a substantially rectangular mass of a horizontal cross-section corresponding to said baling chamber and each having a movable bottom wall member forming said second wall of said baling chamber, each of said charging boxes being movable alternately between a collecting station spaced laterally from and below the level of said baling box and a charging position aligned vertically with said baling chamber, said second box section being disposed in said charging boxes against said bottom wall member at said collecting station to locate the second box section about the lower end portion of the mass formed in said charging boxes, and said means for forcing said second wall including reciprocative power means located below said charging position for engaging the bottom wall member of the charging box occupying said charging position and forcing the bottom wall member together with the second box section and mass supported thereon through the charging box and into the baling chamber.

13. A baling press as defined in claim 1, wherein one of said first walls comprises a hinged door movable from a closed position paralleling and confronting another of said first walls to an outwardly open position providing an open doorway for passage of a banded bale from said baling chamber, said one first wall and the first wall confronting the same and two of said walls lying perpendicular thereto each having strapping guide grooves in the inwardly facing surfaces thereof aligned in endwise relation when said second wall is in said compression position and said one wall is in said closed position to define said continuous strapping guide tracks.

14. A baling press as defined in claim 2, wherein one of said first walls comprises a hinged door movable from a closed position paralleling and confronting another of said first walls to an outwardly open position providing an open doorway for passage of a banded bale from said baling chamber, said one first wall and the first wall confronting the same and two of said walls lying perpendicular thereto each having strapping guide grooves in the inwardly facing surfaces thereof aligned in end wise relation when said second wall is in said compression position and said one wall is in said closed position to define said continuous strapping guide tracks.

(References on following page)

References Cited

UNITED STATES PATENTS

| | | | |
|---|---|---|---|
| 3,003,296 | 10/1961 | Feldkamp | 53—176 X |
| 3,031,816 | 5/1962 | Mertens | 53—198 |
| 41,893 | 3/1864 | Ridenour | 100—25 |
| 1,311,367 | 7/1919 | Angier | 53—124 |
| 2,151,000 | 3/1939 | Wilson | 53—19 |
| 3,218,778 | 11/1965 | Moreland | 53—124 |

FOREIGN PATENTS 1,076,554   2/1960   Germany.

WAYNE A. MORSE, Jr., Primary Examiner

U.S. Cl. X.R.

53—24, 176, 198; 93—55.1; 100—25